US012191104B2

(12) United States Patent
Orban et al.

(10) Patent No.: US 12,191,104 B2
(45) Date of Patent: Jan. 7, 2025

(54) PROTECTION UNIT FOR CONTROL/COMMAND UNITS OF AN ELECTRICAL ENCLOSURE

(71) Applicant: Schneider Electric Industries SAS, Rueil Malmaison (FR)

(72) Inventors: Rémy Orban, Saint Martin d'Uriage (FR); Jean-Luc Bouchard, Grenoble (FR); Sébastien Heraud, Grenoble (FR); Eric Nguyen, Seyssins (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 228 days.

(21) Appl. No.: 18/081,730

(22) Filed: Dec. 15, 2022

(65) Prior Publication Data

US 2023/0197369 A1 Jun. 22, 2023

(30) Foreign Application Priority Data

Dec. 17, 2021 (FR) ....................................... 2113920

(51) Int. Cl.
*H01H 9/20* (2006.01)
*H01H 9/02* (2006.01)

(52) U.S. Cl.
CPC ................ *H01H 9/20* (2013.01); *H01H 9/02* (2013.01)

(58) Field of Classification Search
CPC .......... H01H 9/20; H01H 9/02; H01H 9/0066; H01H 9/0072; H01H 50/002; H01H 71/46; H01H 2050/325; H01H 9/281; H02B 1/04; H02B 1/26
USPC .......... 200/43.01, 43.11, 43.14, 43.16, 43.19
See application file for complete search history.

(56) References Cited

U.S. PATENT DOCUMENTS 4,635,013 A 1/1987 Emarquand et al.
5,504,284 A 4/1996 Lazareth et al.
11,616,347 B2 * 3/2023 Meley ................. H01H 31/003 200/50.23
2013/0186736 A1 * 7/2013 Keim ....................... H01H 3/40 200/50.26

(Continued)

FOREIGN PATENT DOCUMENTS

EP 0161946 A1 11/1985
EP 0610143 A1 8/1994
EP 3322052 A1 5/2018

OTHER PUBLICATIONS

French Search Report and Written Opinion dated Jul. 7, 2022 for corresponding French Patent Application No. FR 2113920, 7 pages.

*Primary Examiner* — Lheiren Mae A Caroc
(74) *Attorney, Agent, or Firm* — Locke Lord LLP

(57) ABSTRACT

A protection unit, including a power switching device, with a mechanical switch. To improve the multipurpose nature of the power switching while making lockout easier and more reliable, provision is made for the power switching device to include an electrical actuator actuating the mechanical switch and being controlled by an electronic control unit, which is itself powered via an auxiliary switching device. A lockout system with a lock is provided, which, in a lockout configuration, mechanically keeps the mechanical switch and the auxiliary switching device in an isolation configuration, and, in operating configuration, allows the mechanical switch and the auxiliary switching device to move between the conduction configuration and the isolation configuration.

10 Claims, 17 Drawing Sheets

(56) References Cited

U.S. PATENT DOCUMENTS

2018/0131165 A1* 5/2018 Yang .................. H01R 13/7035
2018/0138671 A1 5/2018 Meley et al.

* cited by examiner

PROTECTION UNIT FOR CONTROL/COMMAND UNITS OF AN ELECTRICAL ENCLOSURE

TECHNICAL FIELD

The present invention relates to a protection unit, for electrically connecting an electrical power supply to control/command units of an electrical enclosure, and relates to an electrical enclosure comprising such a protection unit.

The invention relates to the general field of electrical protection and of electrical lockout, preferentially for industrial installations.

BACKGROUND

In an industrial context, to connect an electrical power supply to electrical loads, such as electric motors or other machines, it is known practice to install a connecting electrical enclosure, with one or more control/command units, delivering electrical power to the electrical loads, from the electrical power supply. These control/command units are connected in the enclosure to the electrical power supply and comprise electronic and/or mechanical elements to provide the electrical power to the electrical loads. Each control/command unit advantageously takes the form of a drawer.

To ensure electrical protection of the control/command units and of the electrical loads, it is known practice to insert a protection unit, including for example a thermal magnetic circuit breaker and/or a disconnector, between the electrical power supply and the control/command drawers. In addition to the trips that it includes to detect electrical faults, this protection unit can generally be controlled manually by a technician on the front panel of the electrical enclosure, using a control handle.

In order to perform an intervention on the control/command drawers and/or on the electrical loads, it is desirable for the technician to be able to perform an electrical lockout of the protection unit. Through the presence of the control handle, the technician can perform this electrical lockout by positioning the control handle in a position in which the handle forces the internal movable contacts of the device to be in isolation position, and by locking the handle using one or more padlocks. Then, the technician is assured that the control/command drawers and the loads are powered down throughout their intervention.

However, technological advance results in considering a more complex and multipurpose protection unit for providing the electrical protection, which can lead to the absence of a handle on the front panel of the enclosure. However, this absence of handle prevents an electrical lockout from being performed, which is however necessary to protect the technician during their intervention.

SUMMARY

The invention therefore aims to address this problem by proposing a novel protection unit for connecting an electrical power supply to control/command units which, while enhancing the multipurpose nature of the power switching, allows the lockout configuration to be set reliably and easily.

To this end, a subject of the invention is a protection unit, for electrically connecting an electrical power supply to control/command units of an electrical enclosure, the protection unit comprising a housing and at least one power switching device. Said at least one power switching device is disposed in the housing and comprises: a power input, configured to be electrically connected to the electrical power supply; a power output, intended to be electrically connected to the control/command units; and a mechanical switch, which moves between a conduction configuration, in which the mechanical switch electrically links the power output to the power input, and an isolation configuration, in which the mechanical switch electrically isolates the power output from the power input.

According to the invention, said at least one power switching device comprises an electrical actuator, which is configured to actuate the mechanical switch between the conduction configuration and the isolation configuration. According to the invention the protection unit further comprises: an electronic control unit, which is disposed in the housing and which is configured to control said at least one power switching device, by electrically controlling the electrical actuator; an auxiliary switching device, which is disposed in the housing and which comprises an auxiliary input, to be electrically connected to the electrical power supply, an auxiliary output, to be electrically connected to the electronic control unit, and a mechanical control, to switch the auxiliary switching device over between a conduction configuration, in which the auxiliary output is electrically linked to the auxiliary input, and an isolation configuration, in which the auxiliary output is electrically isolated from the auxiliary input; and a lockout system, which comprises a lock, which is movable with respect to the housing. The lockout system is configured to move between: a lockout configuration, in which the lock is positioned in a lockout position and mechanically keeps the mechanical switch of said at least one power switching device in isolation configuration and mechanically keeps the auxiliary switching device in isolation configuration; and an operating configuration, in which the lock is positioned so as to allow the mechanical switch of said at least one power switching device to move between the isolation configuration and the conduction configuration and allows the auxiliary switching device to move between the conduction configuration and the isolation configuration.

One idea on which the invention is based is to provide, in operating configuration, for said at least one power switching device to be controlled electronically by the electronic control unit. Compared to a conventional electromechanical control, the electronic control is more multipurpose and customizable, because the tripping of the switching can be driven according to events, parameters, scenarios and particularly varied information. The control of the power switching device or devices by the electronic control unit can for example be performed on the basis of a program run by the electronic control unit, taking account of varied data, for example obtained from sensors installed in the protection unit, the control/command units, the electrical loads connected to the control/command units, and/or elsewhere. Remote driving of the electronic control unit can also be envisaged.

However, by virtue of the invention, this electronic control of said at least one power switching device is performed without prejudicing the safety of the technician who wants to intervene downstream of the protection unit, notably on the control/command units or the electrical loads which are possibly connected to it. Indeed, the lockout system of the invention allows the lockout configuration to be set in which, simultaneously, the lock cuts the electrical power supply by setting said at least one power switching device to isolation configuration and deactivates the electronic control unit by acting on the auxiliary switching device. Thus, in lockout configuration, there is no risk of the electronic control unit being able to order the mechanical switch of said at least one power switching device to be set to conduction configuration. Conversely, moreover, there is no risk of the mechanical switch being in conduction configuration. In particular, there is no risk of performing a lockout of the electronic control unit without performing a lockout of the mechanical switch, and vice versa, since these two lockouts are necessarily both performed by the lockout positioning of the lock.

Preferably, in operating configuration, said at least one power switching device mechanically prevents the lock from being set to lockout position, when the mechanical switch is in conduction configuration, and mechanically allows the lock to be set to lockout position, when the mechanical switch is in isolation configuration.

Preferably, the lockout system comprises a slide, which is disposed in the housing and which slides with respect to the housing along a main axis that is fixed with respect to the housing. Preferably, in lockout configuration, to mechanically keep the mechanical switch of said at least one power switching device in isolation configuration, the lock keeps the slide in a retaining position with respect to the housing, in which the slide mechanically keeps the mechanical switch in isolation configuration. Preferably, in operating configuration, the slide is driven by the mechanical switch of said at least one power switching device, between: a prevention position, when the mechanical switch is in conduction configuration, in which the lock is prevented from being set to lockout position, and an authorization position, when the mechanical switch is in isolation configuration, in which the lock is allowed to be set to lockout position.

Preferably, the lock pivots with respect to the slide about the main axis, between a lockout orientation, when the lock is in lockout position, and a lockout release orientation, adopted in operating configuration. Preferably, the slide and the lock comprise axial stops, which are disposed so as to: be opposite one another parallel to the main axis when the lock is in the lockout position, so that, in lockout configuration, the lock retains the slide in retaining position by the abutting of the axial stops thus facing one another; and be offset with respect to one another about the main axis when the lock is in the lockout release orientation, so that, in operating configuration, the lock allows the slide to be displaced between the prevention position and the authorization position.

Preferably, the lock and the slide comprise rotation stops, which are disposed so as to: be at the same height along the main axis, when the lockout system is in operating configuration with the slide in prevention position, for the slide to keep the lock in the lockout release orientation by the abutting of the rotation stops; and be at different heights along the main axis, when the lockout system is in lockout configuration, or the slide to allow the lock to be pivoted between the lockout orientation and the lockout release orientation.

Preferably, the lock is fixed in translation along the main axis, with respect to the housing.

Preferably, the lockout system comprises a slide spring, which exerts an elastic force on the slide, by bearing on the housing, tending to displace the slide towards the prevention position, when the slide is in retaining position.

Preferably, the lock comprises a ramp, which is configured to actuate the mechanical control of the auxiliary switching device, to set the auxiliary switching device to isolation configuration, when the lock is in lockout position and which is configured to not actuate the mechanical control when the lockout system is in operating configuration.

Preferably, the lock comprises a lockout orifice and the lockout system comprises a masking system, which is configured to: allow the lockout orifice to receive a padlock, when the lockout system is in lockout configuration; and mask the lockout orifice when the lockout system is in operating configuration, to prevent the lockout orifice from receiving the padlock.

Preferably, the lock comprises an external part, which: in operating configuration with the slide in prevention position, is retracted inside the housing to prevent the lock from being set to lockout position; and in operating configuration with the slide in authorization position and in lockout configuration, extends out of the housing to allow the lock (250) to be set to lockout position.

Preferably, when the lock is in the lockout release orientation, the lock slides with respect to the housing and to the slide along the main axis. Preferably, with respect to the slide, the lock slides between an initial height, adopted in operating configuration, and a lockout height, adopted in lockout configuration, the lock being at the lockout height when the lock is in lockout position. Preferably, the lockout system comprises a lock spring, which exerts an elastic force on the lock, by bearing on the slide, tending to displace the lock towards the initial height when the lock is at the lockout height. The lock and the housing comprise axial stops, which are disposed so as to: be opposite one another parallel to the main axis when the lock is in the lockout position, so that, in lockout configuration, the housing retains the lock in retaining position by abutment, parallel to the main axis, of the axial stops that are thus facing one another; and be offset with respect to one another about the main axis when the lock is in the lockout release orientation, so that, in operating configuration, the housing allows the lock to be displaced between the lockout height and the initial height.

Also a subject of the invention is an electrical enclosure, comprising the protection unit, the control/command units, electrically connected to the power output of said at least one power switching device.

BRIEF DESCRIPTION OF THE DRAWINGS

The invention will be better understood and other advantages thereof will become more clearly apparent in light of the following description of embodiments of the invention, the description being given purely as an example and with reference to the attached drawings presented hereinbelow.

DETAILED DESCRIPTION

Figure 1:
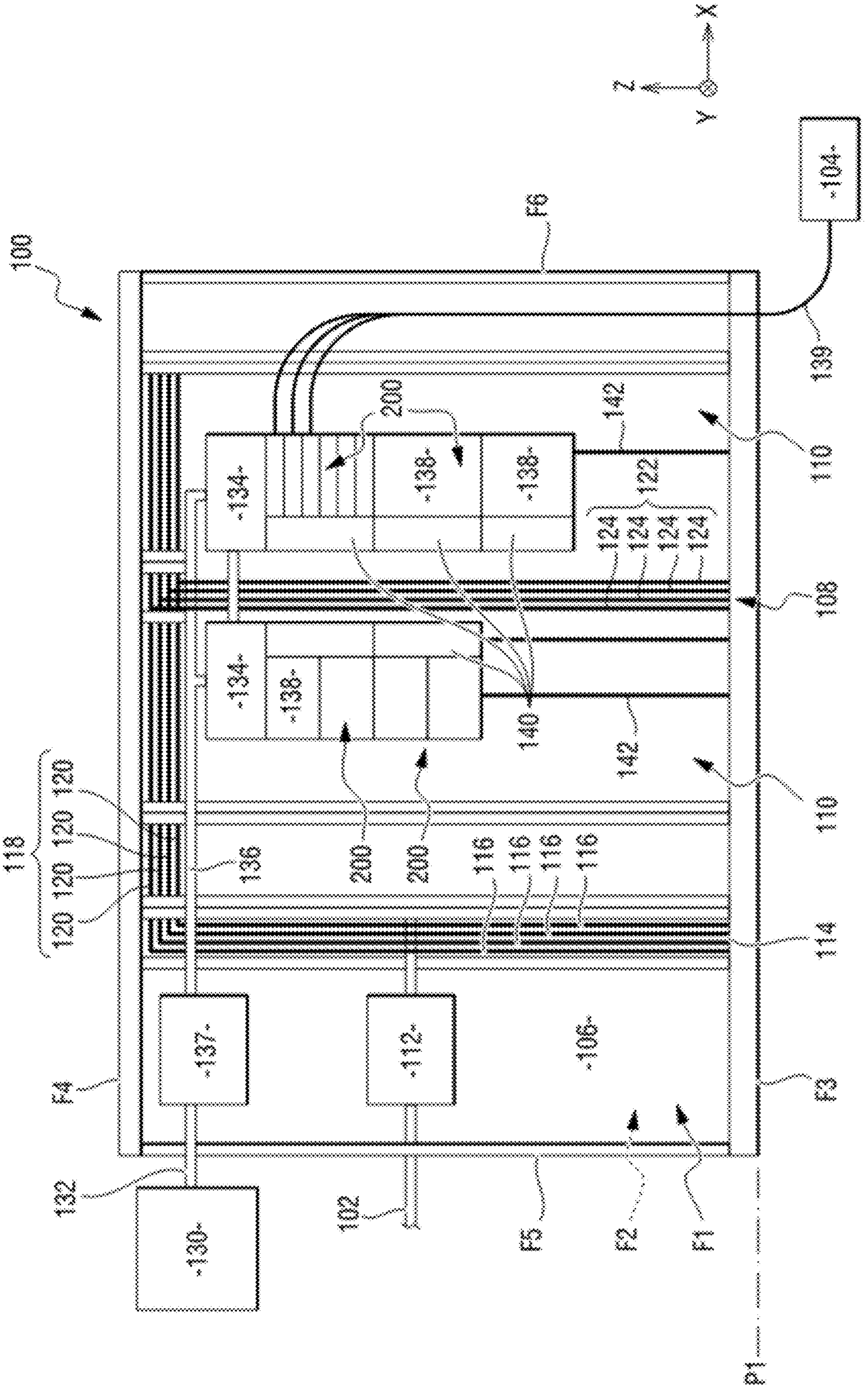
FIG. 1 is a schematic front view of an electrical enclosure according to a first embodiment of the invention.

An electrical enclosure 100 is represented in FIG. 1. This electrical enclosure is intended to be incorporated in an electrical network that is partially represented. This electrical network comprises, on the one hand, upstream of the electrical enclosure 100, power supply cables 102 originating for example from a transformation station and, on the other hand, downstream of the electrical enclosure, one or more electrical loads 104. The electrical enclosure 100 can be qualified as connection enclosure, in that its purpose is to connect the electrical loads 104 to the power supply cables 102.

When the electrical enclosure 100 is in installed configuration, the enclosure rests on a horizontal surface represented by a plane P1. In practice, the plane P1 is for example the floor of a building in which the electrical enclosure 100 is installed.

A direction X of the electrical enclosure 100 is defined as oriented according to the greatest dimension of the electrical enclosure 100, in practice its width. A direction Y is defined as oriented according to the smallest dimension of the electrical enclosure 100 and at right angles to the direction X, in practice its depth. A direction Z is defined, oriented at right angles to the directions X and Y, the direction Z being oriented according to the height of the enclosure. The orientation of the directions X, Y and Z is fixedly linked to the orientation of the electrical enclosure 100.

In the installed configuration described here, a plane at right angles to the direction Z is horizontal and parallel to the plane P1, whereas the direction Z is oriented upwards. The qualifier "horizontal" used hereinafter in the explanation applies to any element contained in a plane at right angles to the direction Z, in the installed configuration of the electrical enclosure 100. The qualifiers "left" and "right" are understood according to the direction X and the qualifiers "front" and "rear" are understood according to the direction Y.

The enclosure comprises a front face F1 or front panel and a rear face F2, that are opposite and at right angles to the direction Y, a bottom face F3 and a top face F4, that are opposite and at right angles to the direction Z, and a left face F5 and a right face F6, that are opposite and at right angles to the direction X. These faces F1 to F6 are overall flat and disposed parallelepipedally. These faces F1 to F6 constitute an outer jacket of the enclosure. The face F3 is disposed on the plane P1.

The power supply cables 102 deliver to the electrical enclosure 100 a main electrical power supply, preferably with a voltage of 400 V three-phase with neutral, preferably at a frequency of 50 Hz. As a variant, the power supply cable 102 delivers a three-phase current without neutral, or a single-phase current.

The electrical loads 104 are preferentially electric motors, such as three-phase motors. For example, the electric motor can require a nominal electrical power of between 5 and 100 KW. As a variant, all or part of the electrical loads 104 can be of other types of electrical machines or electricity distribution networks.

As can be seen in FIG. 1, the electrical enclosure 100 comprises a power supply column 106, at least one electrical distribution column 108 and at least one connection column 110. The power supply columns 106, distribution columns 108 and connection columns 110 are juxtaposed according to the direction X.

In the example represented, the electrical enclosure 100 comprises an electrical distribution column 108 and two connection columns 110, disposed on either side of the electrical distribution column 108. In practice, a connection column 110 is always juxtaposed with an electrical distribution column 108. An electrical distribution column 108 is always juxtaposed to one or to two connection columns 110.

The association of an electrical distribution column 108 and of one or two connection columns 110 forms a functional column. When a functional column comprises two connection columns 110, these two columns are situated respectively on either side, namely to the left and the right, of the electrical distribution column 108. When a functional column comprises a single connection column 110, this column is situated without preference on one side or the other, namely to the left or to the right of the electrical distribution column 108. In the example illustrated, the electrical enclosure 100 comprises a single functional column. As a variant, the electrical enclosure comprises several functional columns, juxtaposed according to the direction X.

The power supply column 106 makes it possible to supply all of the electrical enclosure 100 with electrical energy from the power supply cable 102. Preferably, the power supply column is disposed at a longitudinal end of the enclosure 100 in the direction X, as in the example represented, in which the power supply column is on the left of the enclosure 100.

As can be seen in FIG. 1, in the power supply column 106, each phase and the neutral of the power supply cable 102 is connected to a respective input of a protection device 112, such as a circuit breaker, belonging to the power supply column 106.

In the example, the power supply column 106 also comprises a power supply busbar 114, comprising several power supply bars 116, here vertical. Each output of the protection device 112 is respectively linked to one of the power supply bars 116. Thus, in the example where the electrical enclosure 100 is supplied with three-phase current with neutral, the busbar 114 of the column 106 comprises four power supply bars 116, corresponding to the three phases and the neutral of the power supply current.

The power supply busbar 114 is connected to a power supply busbar 118. The busbar 118 comprises several power supply bars 120, oriented parallel to the direction X and arranged at the top end of the enclosure 100. The bars 118 respectively prolong the bars 114. The busbar 118 makes it possible to supply each electrical distribution column 108 of the enclosure 100.

Each electrical distribution column 108 comprises a power supply busbar 122, with several power supply bars 124, which derive respectively from the bars 120 of the busbar 118 to supply the column 108. The bars 124 are, here, vertical and supply the or each connection column 110 adjacent to the electrical distribution column 108 concerned.

Based on the electrical power to be delivered, the bars 116, 120 and 124 are made of electrically conductive material, for example of copper, and have for example a section of between 250 and 3000 $mm^2$. Provision is made for the power supply cables 102 to be dimensioned in the same way.

The device 112 and the bars 116, 120 and 124 constitute an electrical power supply of the enclosure 100. The protection device 112, electrically inserted between the bars 116 and the cables 102, therefore makes it possible to cut the electrical power supply of the enclosure 100, in the event of an electrical fault and/or on command.

Each connection column 110 allows the electrical connection of one or more electrical loads 104 to the electrical enclosure 100 and makes it possible to control and/or monitor the electrical loads 104 which are connected to it.

The electrical enclosure 100 is controlled by an industrial computer 130, preferentially disposed outside of the enclosure 100 by being linked to the enclosure 100 by communication cables 132. This industrial computer makes it possible to control in particular the connection columns 110. Preferably, the industrial computer 130 comprises a computation unit that is not represented which executes management software of the electrical enclosure 100.

As a variant, the industrial computer 130 is replaced by a real-time data control and acquisition system, called "SCADA", which supervises the operation of the electrical enclosure 100, or the computer is incorporated in such a system.

Each connection column 110 comprises a communication module 134. For example, the communication module 134 is positioned in proximity to the top end of the connection column 110. The communication module 134 makes it possible to centralize all of the information originating from the connection column 110 and to control the connection column 110.

The communication module 134 communicates with the industrial computer 130 via communication cables 132, on the one hand to transmit information on the operation of the connection column 110 and, on the other hand, to receive the commands originating from the industrial computer 130 and that have to be transmitted to the connection column 110. The communication module 134 of a connection column 110 therefore forms an intermediary between the industrial computer 130 and this connection column 110 and makes it possible to centralize the exchanges between the computer 130 and the column 110.

Each communication module in practice comprises a controlled network switch, called "managed switch". When the electrical enclosure 100 comprises several connection columns 110, as in the example of FIG. 1, the communication modules 134 of each connection column are linked together by internal communication cables 136. In practice, it is the managed switches of the communication modules which are linked together by the internal communication cables 136. Preferably, the managed switches of the communication modules 134 are all linked to a central switch 137 by the internal communication cables 136, the central switch 137 being disposed preferably in the power supply column 106. This central switch 137 forms an intermediary between the communication modules 134 and the industrial computer 130, that is to say that the information originating from the industrial computer 130, for example commands, are distributed between the communication modules by the central switch 137 and that the information originating from the communication modules 134 is aggregated by the central switch before being transmitted to the industrial computer. Thus, each managed switch is linked to the industrial computer 130, independently of the other managed switches.

As a variant, when the electrical enclosure 100 comprises several connection columns 110, the managed switch of each communication module 134 is directly linked to the industrial computer, without passing through a switch of the type of the switch 137.

For example, the internal communication cables 136 are cables using the Ethernet protocol. As a variant, the internal communication cables 136 use another local area network protocol, such as, for example, the MODBUS or PROFINET protocol.

As can be seen in FIG. 1, to allow the connection of the electrical loads 104, each connection column 110 has one or more control/command modules 200. Each control/command module 200 comprises a protection unit 140 and one or more control/command units 138. Each electrical load 104 is electrically connected to one of the units 138. Preferably, a face of each communication module 134 of each control/command unit 138 and of each protection unit 140 is accessible from the outside through the front face F1.

In the example represented, a connection column 110 comprises up to five modules 200, each module comprising a single unit 140 and up to six units 138. There are therefore up to five protection units 140 and up to thirty control/command units 138 per column 110. It is however possible to provide a maximum number of different units for each column 110. The connection column 110 is advantageously modulable, that is to say that it is possible to install on it as many modules 200 as are desired and, in each module 200, as many units 138 as are desired. The modules 200 are juxtaposed in the direction Z, under the communication module 134. The protection units 140 are juxtaposed in the direction Z in the connection column 110. By being adjacent to the units 140 in the direction X, the units 138 are juxtaposed in the direction Z in the connection column 110. In the direction X, the units 140 are disposed between the units 138 and the distribution column 108.

Preferably, a face of each communication module 134, of each control/command unit 138 and of each protection unit 140 is accessible from the outside through the front face F1.

In the example represented, the protection units 140 are protection drawers which can therefore be installed in, and removed from, the connection column 110 simply and rapidly. As a variant, the units 140 are fixed units of the enclosure 100, which are assembled during the installation of the enclosure, for example by screwing into the column or columns 110.

Each protection unit 140 is configured to electrically connect one or more units 138 to the electrical power supply, for these units 138 to supply a power supply to these loads 104, derived from this electrical power supply. In other words, each unit 138 is connected to the electrical power supply via a single protection unit 140. The protection unit 140 distributes the electrical power supply to one or more units 138. Each protection unit 140 is also configured to electrically protect the unit or units 138 that it connects to the electrical power supply, by isolating the units 138 from the electrical power supply when necessary.

Being adjacent to the column 108, each protection unit 140 is electrically connected to the electrical power supply by the busbar 122, which distributes the electrical power supply to all the units 140 of this column 110. The protection units 140 electrically connect the control/command units 138 of the same column 110 from said busbar 122, supplying the electrical power supply.

In the example represented, the control/command units 138 are control/command drawers which can therefore be installed in, and removed from, the connection column 110 simply and rapidly. As a variant, the control/command units 138 are fixed units of the enclosure, which are assembled during the installation of the enclosure, for example by screwing into the column or columns 110.

Preferably, each control/command unit 138 is connected to a respective single electrical load 104. Provision could however be made for each unit 138 to be connected to several loads 104.

In connecting the load 104, the control/command unit 138 supplies an electrical power supply to the load 104, which is derived from the electrical power supply supplied by the unit 140 to the unit 138.

The function of the control/command units 138 is to control electrical loads 104 which are connected to them. This control comprises, for example, when the electrical load is a motor, driving this motor, that it to say starting it, stopping it and possibly controlling its speed and/or its torque. According to another example, when the electrical load is a distribution network, the control comprises delivering the voltage and the current necessary to the correct operation of this distribution network.

Furthermore, the control/command units 138 also allow monitoring, that is to say supervision of the electrical loads 104 which are connected to them. This monitoring consists, for example, in measuring electrical quantities concerning the electrical power supply delivered to the load 104, for example concerning the intensity of the current, the voltage and/or the frequency, or even retrieving information originating from sensors with which the loads 104 are equipped, or sensors placed in proximity to the loads 104, such as, for example, position, speed, rotation and temperature sensors, or even sensors for measuring electrical quantities, such as a voltage, a current or a frequency, received by the loads 104. The information on the load 104 derived from the monitoring advantageously allows the unit 138 to drive the load 104, that is to say apply a control that takes account of the monitoring.

Thus, each control/command unit 138 can serve to connect an electrical load 104, to control this load and to monitor this load. However, depending on the type of electrical load 104 connected to the control/command unit 138, this unit 138 may not serve to control this load, or may not serve to monitor the load.

Since the electrical loads 104 are remote from the enclosure 100, they are connected to the control/command units 138 via connection cables 139.

In the preferential case where the load 104 is an electric motor, the unit 138 advantageously comprises, to control and monitor the electrical load 104, at least one contactor, a thermal protection relay, sensors of operation of the unit 138, and electronic components configured to collect signals originating from sensors of operation of the electrical load 104, disposed on, or in proximity to, the electrical load 104, such as temperature probes or speed sensors for example.

The thermal protection relay is, for example, a bimetallic strip electromechanical relay or even an electronic relay, the role of which is to protect the load 104 supplied by the unit 138 from any overloads that may occur notably on startup, if the load 104 is an electric motor. The sensors are, for example, voltage sensors, measuring the voltage of the electrical power supply from the protection unit 140.

To control the load 104, the control/command unit 138 advantageously includes power converters, variable frequency drives, and/or other components for converting the electrical power supply supplied by the unit 140 into a transformed electrical power supply, to supply power and control the load 104.

As can be seen in FIG. 1, each connection column 110 advantageously comprises a computer bus 142. For each column 110, the bus 142 links the communication module 134 to all of the modules 200, in particular to the units 138 and 140. Each protection unit 140 and each control/command unit 138 is therefore connected to the communication module 134 with which the column 110 is equipped.

The computer bus 142 for example takes the form of a housing comprising an electronic circuit board, that is to say a printed circuit, of elongate form, disposed vertically in the connection column 110. This electronic circuit board comprises electronic circuits, or tracks, allowing communication, that is to say the exchange of data, in the column 110, for example according to the Ethernet protocol, between the managed switch of the communication module 134 and the units 138 and 140. Using the computer bus 142, the communication module 134 controls and monitors each protection unit 140 and each control/command unit 138 of the column 110.

The computer bus 142 also supplies an auxiliary electrical power supply to the units 138 of the column 110, by comprising, for example, electrical power supply tracks. The auxiliary electrical power supply is advantageously supplied by the communication module 134, which comprises for example a power supply block or several redundant power supply blocks. To supply this auxiliary electrical power supply, provision is made for example for the enclosure 100 to be supplied by an external auxiliary electrical power source. As a variant, provision can be made for the enclosure 100 to have electrical conversion means, disposed for example in the column 106, to derive the auxiliary electrical power supply from the electrical power supply, for example downstream of the device 112. The auxiliary electrical power supply is, for example, a DC electrical voltage of 48 V. As a variant, the auxiliary voltage has a different value, for example 12 V, 24 V, 110 V DC or 110 V AC. As a variant, the auxiliary electrical power supply forms a multiple power supply, delivering several different voltages intended for different systems with which the units 138 and 140 are equipped.

As a variant, the computer bus 142 could take the form of a bundle of cables to ensure the communication and the auxiliary electrical power supply.

The unit 138 advantageously comprises an electronic control unit, for example in the form of a control electronic circuit board. The control electronic circuit board is linked to the communication module 134 of the column 110 via the bus 142. The control electronic circuit board makes it possible to control and monitor the functional elements of the unit 138, namely the contactor or contactors, the thermal protection relay, the operation sensors, and the electronic components and/or the converters. The electronic circuit board groups together the information originating from the operation sensors and the information originating from the electronic components configured to collect signals originating from the sensors of operation of the electrical load 104, before analyzing said information and transmitting it to the communication module 134. Based on this analysis of the information originating from the drawer and electrical load operation sensors, the electronic circuit board can adapt its control of the functional elements, for example by ordering the contactor to interrupt the power supply of the electrical load when an operation sensor reports a malfunction of the electrical load.

Thus, by virtue of the functional elements and the electronic circuit board, each unit 138 supplies, controls and monitors the electrical load 104. Each unit 138 therefore simultaneously serves to supply power to, control and monitor the electrical load 104. The electronic circuit board and the functional elements of the unit 138 are supplied by the auxiliary electrical power supply for their operation.

One of the protection units 140 is represented in more detail in FIGS. 2 to 12.

The protection unit 140 comprises a housing 1. A main axis Y1 is defined, parallel to the direction Y and fixed with respect to the housing 1. The unit 140 is fixed to the enclosure via its housing 1. The control/command units 138 and the loads 104 are disposed outside of the housing 1.

For example, the housing 1 forms a front face 11 or front panel and a rear face 12, opposite and at right angles to the direction Y and passed through by the axis Y1. The housing 1 forms also an internal face 13 and an external face 14, opposite and parallel to the axis Z. The faces 13 and 14 link the faces 11 and 12 together. The housing 1 finally forms a top face and a bottom face, that are opposite and parallel to the direction X, linking the faces 11 and 12 together parallel to the direction Y, and linking the faces 13 and 14 together, parallel to the direction X. In the mounted configuration of the unit 140, the front face 11 is coplanar with the face F1 of the enclosure 100.

Figure 3:
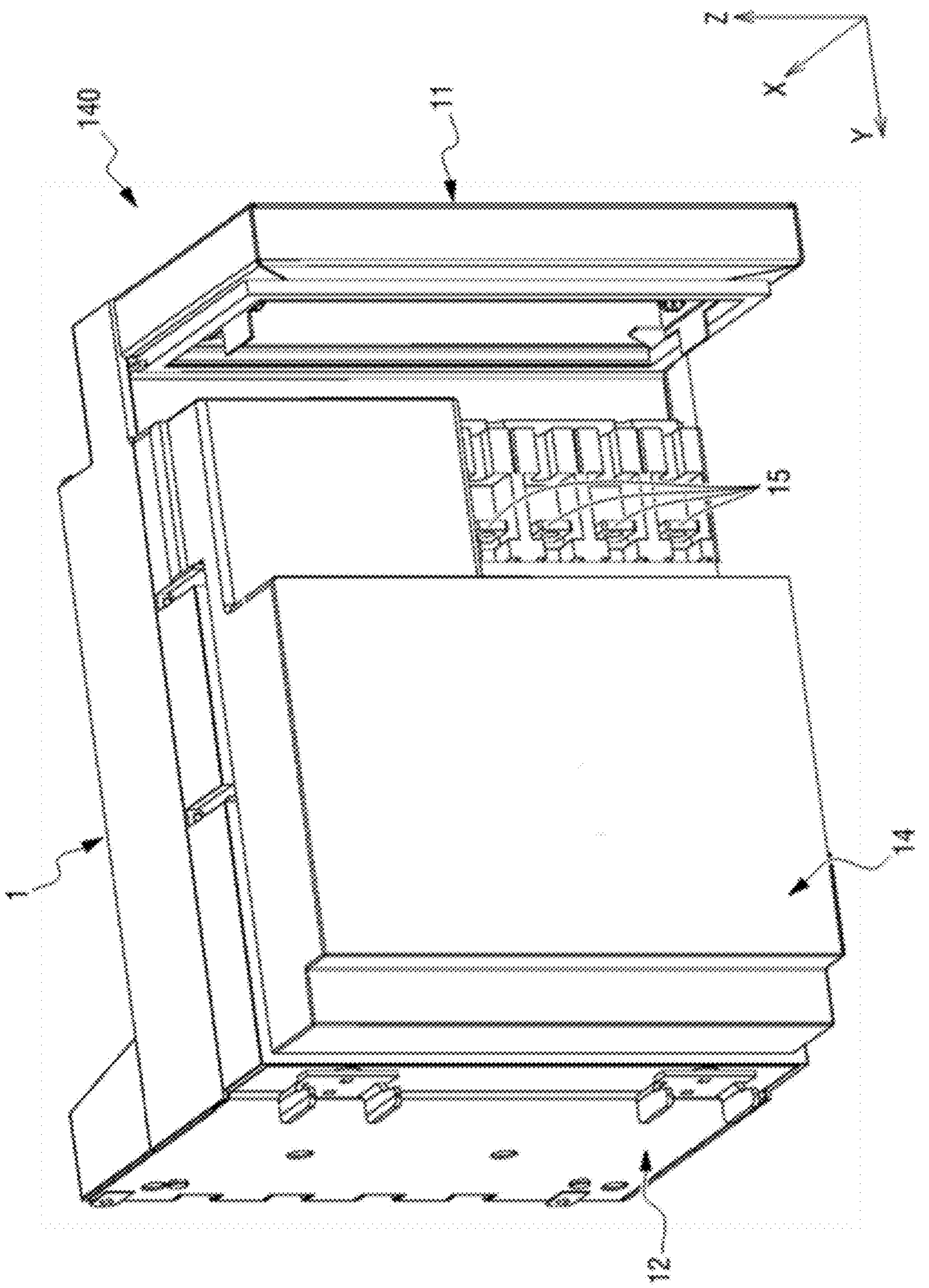
FIG. 3 is a perspective view of the protection unit of FIG. 2, from another angle.

The electrical connection of the protection unit 140 and the electrical power supply is done via the busbar 122. For this, while the busbar 122 extends along the outer face 14, the unit 140 comprises, for example, electrical connectors 15, disposed on the outer face 14, as shown in FIG. 3. Each connector 15 is connected to one of the bars 124, to receive a phase or the neutral. For example, the protection unit 140 comprises four electrical connectors 15, to connect the three phases and a neutral conveyed respectively by the four bars 124.

Figure 2:
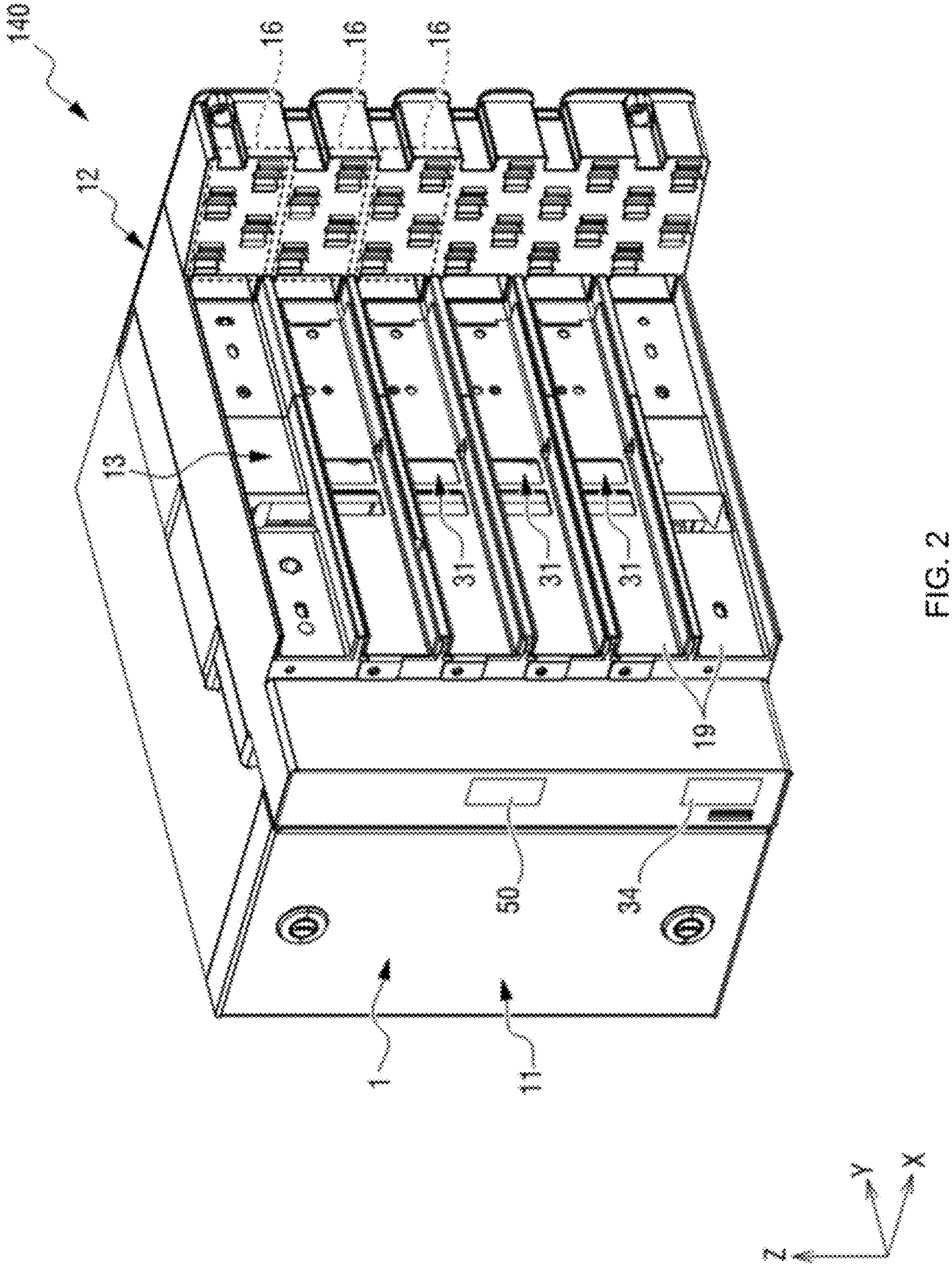
FIG. 2 is a perspective view of a protection unit belonging to the enclosure of FIG. 1.

To electrically connect the units 138 to the unit 140, in order for the unit 140 to deliver the electrical power supply to the units 138, the protection unit 140 advantageously comprises output electrical connectors 16. Each connector 16 is connected to a single unit 138. While the units 138 are disposed along the inner face 13, these connectors 16 are advantageously disposed on the inner face 13, along the rear face 12, turned towards the front face 11, as shown in FIG. 2. The connectors 16 are distributed in the direction Z. Here, the protection unit 140 comprises six connectors 16, for the connection of six respective units 138. Each connector 16 advantageously forms four electrical outputs, respectively delivering the three phases and the neutral of the electrical power supply.

Preferably, as can be seen in FIG. 2, the face 13 of the housing 1 forms rails 19, here six rails 19, parallel to the direction Y, and distributed according to the direction Z. Each rail 19 is at the height of one of the connectors 16, in the direction Z. Each rail 19 is designed to receive one of the control/command units 138, when it takes the form of a drawer, the control/command unit 138 being designed to be threaded in the direction Y into the rail 19. Thereby, for example, a plug-in connector of the unit 138 is plugged into the connector 16 disposed at the end of this rail 19, which electrically connects the unit 138 to the electrical power supply supplied by the protection unit 140.

Preferably, the neutral connector 15 is electrically linked to a respective neutral electrical output of all the connectors 16, by a neutral conduction path disposed inside the housing 1, and not represented.

Figure 4:
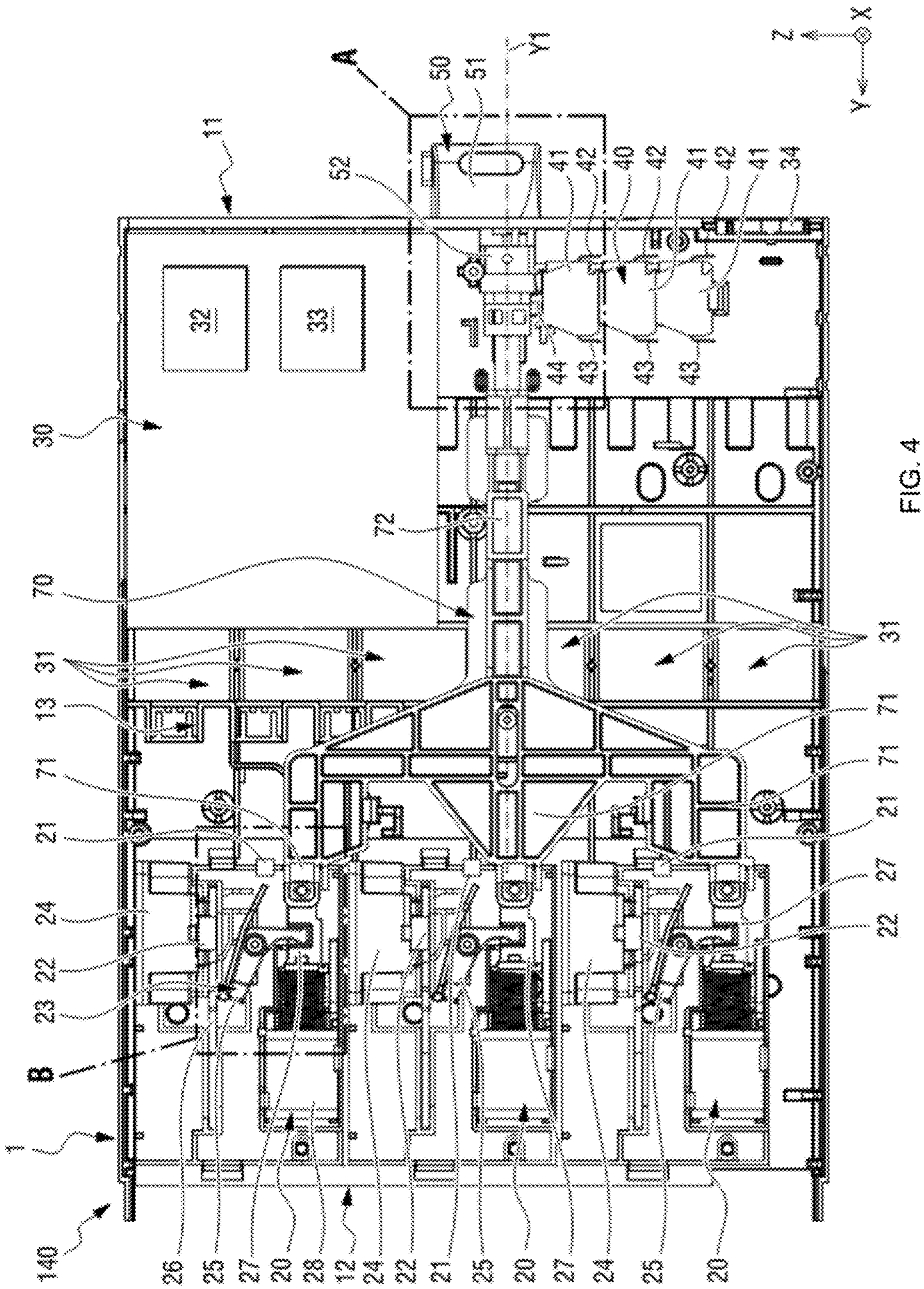
FIG. 4 is a side view showing the interior of the protection unit of the preceding figures, in an operating configuration, with mechanical contacts in conduction configuration and a slide in prevention position.
Figure 5A:
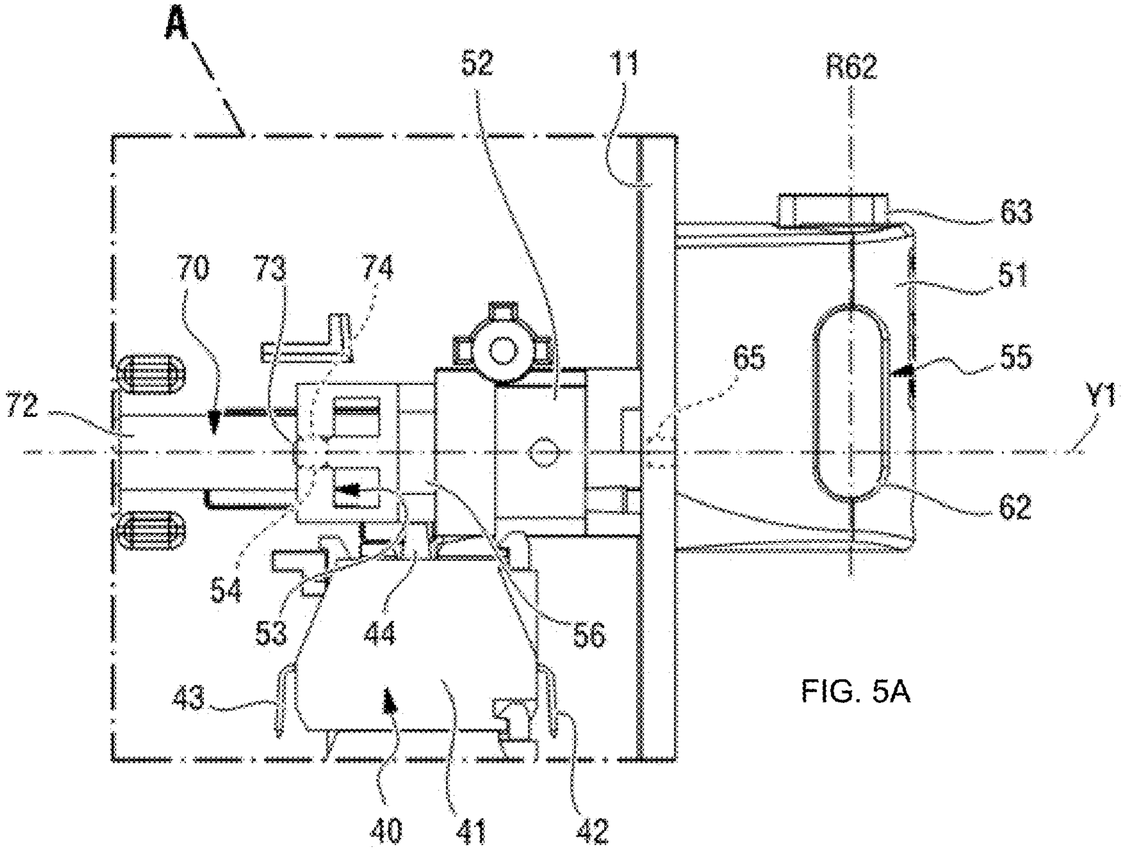
FIG. 5A shows a detail A of FIG. 4
Figure 5B:
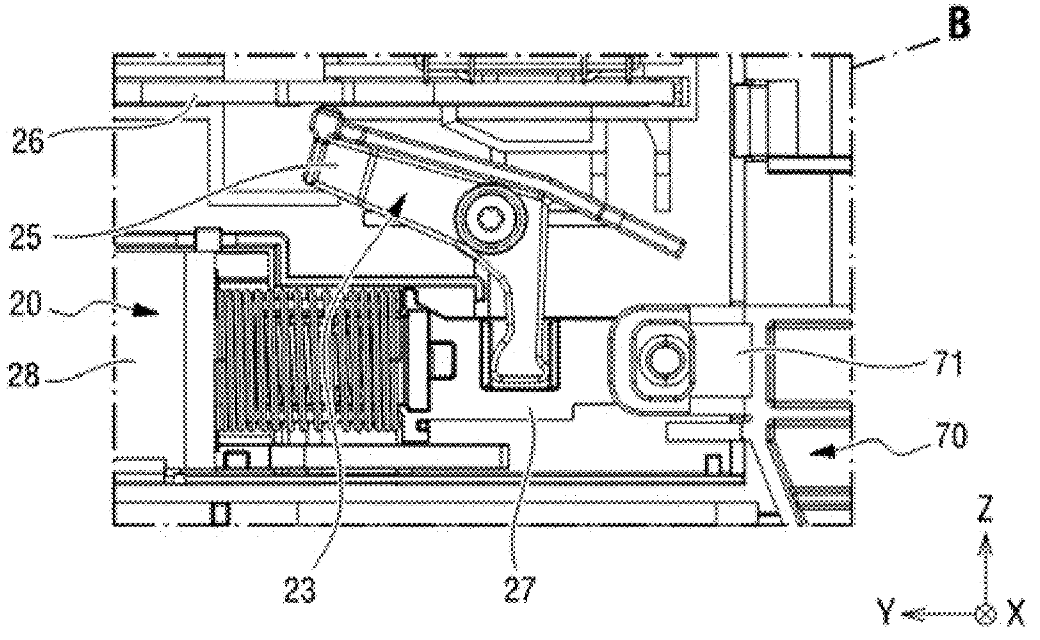
FIG. 5B shows a detail B of FIG. 4.

As shown in FIG. 4, for each phase connector 15, the protection unit 140 has a respective power switching device 20. Here, the protection unit 140 therefore comprises three devices 20, as shown in FIG. 4. Each device 20 links one of the connectors 15 to a respective phase electrical output of all the connectors 16. Thus, for each connector 16, the three phase electrical outputs are respectively linked to one of the phase connectors 15 via one of the devices 20.

The devices 20 are disposed inside, here being distributed parallel to the direction Z, along the face 12 of the housing 1. As a variant, depending on the number of phases to be protected, a number of devices 20 other than three can be provided. At least a single device 20 is provided.

The devices 20 ensure the protection function of the protection unit 140. For this, each device 20 is configured to selectively electrically link or isolate the connector 15 to/from the corresponding outputs of the connectors 16.

Each device 20 comprises a power input 21, electrically connected to the connector 15. Thus, the power input 21 is connected to the electrical power supply supplied by one of the bars 124, via the connector 15, when the unit 140 is installed in the enclosure 100. In FIG. 4, the electrical connection between the connector 15 and the input 21 is not represented, in the interests of simplifying the drawing. For example, the input 21 is linked to the connector 15 of a flexible conductor and/or of a conduction bar.

Each device 20 also comprises a power output 22, which is electrically connected to each connector 16, to supply one of the outputs of each of the connectors 16. Thus, each power output 22 is electrically connected to the control/command units 138 via the connectors 16. In FIG. 4, the electrical connection between the output 22 and the connectors 16 is not represented in the interests of simplifying the drawing. Provision is advantageously made for the electrical connection to be made using wiring and/or conduction bars.

Each device 20 comprises a power mechanical switch 23. The mechanical switch 23 moves between a conduction configuration, shown in FIGS. 4, 5A and 5B, in which the switch 23 electrically links the input 21 to the output 22, and an isolation configuration, shown in FIGS. 7A, 7B, 9A and 9B, in which the switch 23 electrically isolates the input 21 from the output 22, to electrically protect the units 138 and the loads 104.

Preferably, the switch 23 is designed to ensure a disconnector function, aiming to separate the electrical power supply from the units 138 with low interrupting capacity. Preferably, for each device 20, another power switch 24 is provided in addition to the switch 23, to ensure the protection function. The switch 24 can be mechanical or electronic, to ensure a circuit breaker function ensuring a rapid isolation with a stronger interrupting capacity, notably in the case of an electrical fault on the loads 104 and/or on the units 138. In the example, each switch 24 is electrically inserted between the power output 22 of one of the devices 20 and the connectors 16 that this output 22 serves. In the example, each switch 24 is electronic, the interrupting being performed using semiconductor components such as cut-off transistors or thyristors.

As a variant, the mechanical switch 23 is designed to have the circuit breaker function without ensuring a disconnector function, or is designed to perform both functions at the same time.

In the example, each mechanical switch 23 comprises a movable contact 25 and a fixed contact 26. The movable contact 25 is, here, a pivoting contact. The contact 25 is movable with respect to the housing 1, while the contact 26 remains fixed with respect to the housing 1. In conduction configuration, the movable contact 25 is positioned so as to be in electrical contact with the contact 26, to electrically connect the input 21 to the output 22. In isolation configuration, the movable contact 25 is positioned at a distance from the contact 26 to electrically isolate the output 22 from the input 21. In the example, the mechanical switch 23 comprises a slide 27, which slides with respect to the housing 1 parallel to the axis Y1. The slide 27 cooperates mechanically with the movable contact 25, such that the movable contact 25 is driven between the conduction position and the isolation position by the sliding driving of the slide 27.

Each device 20 comprises an electrical actuator 28, which is configured to actuate the mechanical switch 23 between the conduction configuration and the isolation configuration. The electrical actuator 28 advantageously takes the form of an electromagnetic actuator, which drives the displacement of the movable contact 25 between the conduction and isolation positions, by slidingly driving the slide 27 in the direction Y, to set the switch 23 to conduction configuration, and in the opposite direction, to set the switch to isolation configuration. Here, the electrical actuator 28 is disposed in the direction Y with respect to the slide 27 that it actuates, such that the slide 27 protrudes out of the actuator 28 in the direction opposite the direction Y.

To control the devices 20 and thus ensure the protection of the units 138 and of the loads 104, the protection unit 140 comprises an electronic control unit 30, shown in FIG. 4. The electronic control unit 30 is disposed inside the housing 1.

The electronic control unit 30 here takes the form of an electronic circuit board, such as a printed circuit board, bearing surface components and/or being connected to electronic components. The electronic circuit board extends at right angles to the direction X.

The electronic control unit 30 advantageously comprises communication modules 31, a communication module 32, an electronic analyzer 33 and/or a front panel interface 34.

The analyser 33 is an electronic system, comprising for example a processor implementing computer code stored on a memory, these elements being formed here by the surface components of the electronic circuit board. Functionally, the analyzer is designed to control the devices 20, to control in particular the switches 23, and the switches 24 if they are provided.

To control the switches 23, the analyzer 33 controls the electrical actuators 28, thus making the switches 23 switch over between the conduction configuration and the isolation configuration. To this end, the control unit 30 is connected, preferably by wire, to the electrical actuators 28, in order to send commands to the electrical actuators 28 and/or supply them with electrical power. Preferably, the control unit 30 is connected to the electrical actuators 28 and/or to sensors with which the switches 23 are equipped, in order to receive status feedback information, to detect the current configuration of the switches 23. In other words, the electronic unit 30 also monitors the sensors and takes account of this monitoring to perform the control.

To control the switches 24, the analyzer performs electronic control of the switches 24, when said switches 24 take the form of semiconductor components. To this end, the control unit 30 is connected, preferably by wire, to the switches 24, in order to send commands, supply power and/or possibly receive status feedback to/from the switches 24.

The communication modules 31, if provided, are preferentially separate components connected to the electronic circuit board of the electronic control unit 30.

As shown in FIGS. 2 and 4, the face 13 of the housing 1 preferentially comprises windows, in practice six windows, which open at the height of the rails 19, for each communication module 31 to be able to be connected to one of the control/command units 138. Each control/command unit 138 advantageously comprises lateral contacts to connect the unit 138 to one of these communication modules 31. Each communication module 31 advantageously takes the form of a connector for receiving data originating from the unit 138 to which this module 31 is connected. The module 31 then transmits the data to the analyser 33, which performs control of the devices 20 based on these data. The data received from the unit 138 via the module 31 relate preferentially to the measurements of electrical quantities concerning the electrical power supply delivered to the load 104 by the unit 138, for example concerning the intensity of the current, the voltage and/or the frequency, and/or concerning information originating from sensors with which the loads 104 are equipped, or that are placed in proximity to the loads 104, such as, for example, position, rotation speed and temperature sensors, or even sensors for measuring electrical quantities, such as a voltage, a current or a frequency, received by the loads 104. The data received by the module 31 advantageously concern information similar to that processed by the unit 138 to perform the control/command of the load 104. The unit 138 can also supply pre-processed data to the unit 140. In any case, the data received by the electronic control unit 30 via the modules 31 aims to detect and/or anticipate the possible presence of an electrical fault or of a failure in the units 138 and/or the loads 104. When such a fault and/or failure is detected, the electronic control unit 30 controls the devices 20, using the analyzer 33, to isolate the units 138 with respect to the electrical power supply by switching the switches 23 and/or 24 over to isolation configuration. In the present example, in the case where the switchover must be performed under load, the electronic control unit 30 switches the switches 24 over in order to make the interruption. If a separation must be performed, the electronic control unit 30 switches the switches 23 over to disconnect. When the conditions are met and the fault is acknowledged, possibly with human intervention, the control 30 orders a switchover of the devices 20 to conduction configuration.

The communication module 32, if provided, is advantageously a surface-mounted component of the electronic circuit board of the electronic unit. The communication module 32 is connected to the communication module 134, advantageously via the computer bus 142, in order to exchange data with the communication module 134 of the column 110, ultimately with the industrial computer 130. The electronic unit 30 can therefore receive commands from the computer 130 and/or from the module 134, to switch the devices 20 over to conduction and/or isolation configuration. In particular, off-load, the computer 130 can order a disconnection: then the unit 30 orders the mechanical switches 23, if they constitute disconnectors, to be set to isolation configuration. The electronic unit 30 can thus transmit information concerning the state of the devices 20 to the computer 130, using the communication module 32, the bus 142 and the module 134.

The front panel interface 34, if provided, is advantageously borne by the front face 11 of the protection unit 140, to be accessible by a technician from the face F1 of the enclosure 100.

Preferably, the front panel interface 34 comprises measurement connectors, for example in the form of banana plugs, configured to be connected to a measurement device, for a technician to be able to measure electrical quantities specific to the unit 140, notably for a maintenance operation. Each measurement connector of the front panel interface 34 is electrically connected to one of the phases or to the neutral inside the housing 1, coming from the electrical power supply. In particular, each measurement connector is connected downstream of one of the electrical connectors 15. If necessary, the measurement connector is connected upstream of the input 21 of the device 20 which is electrically connected to this electrical connector 15. Here, four measurement connectors are provided, respectively for the three phases and the neutral. The measurement device connected to the measurement connectors can thus for example measure the voltage on the phases of the unit 140, or other electrical quantities, via the measurement connectors, whether the devices 20 are in conduction or isolation configuration.

Alternatively or in addition, the front panel interface 34 constitutes a human-machine interface, for example in the form of pushbuttons and/or a screen, for the technician to order the devices 20 to be set to conduction configuration and to isolation configuration. The front panel interface 34 advantageously forms a component that is separate from the electronic circuit board of the electronic control unit 30, and which is connected to it. The electronic control unit controls the devices 20 by taking account of any commands received from the front panel interface 34.

For its operation, the electronic control unit 30 is supplied with electrical energy by the electrical power supply.

To this end, the protection unit 140 comprises an auxiliary switching device 40, which is disposed in the housing 1, here in proximity to the face 11. The auxiliary switching device 40 is able to move between a conduction configuration, for the electronic unit 30 to be electrically supplied by the electrical power supply, and an isolation configuration, for the electronic unit 30 to be electrically isolated from the electrical power supply. The device 40 here takes the form of three switches 41, which move in coordinated fashion between a conduction configuration and an isolation configuration. In conduction configuration, each switch 41 connects the electronic unit 30 to one of the phases of the electrical power supply. In isolation configuration, each switch 41 electrically isolates the electronic unit from this phase.

More specifically, to be thus electrically supplied, each switch 41 has an auxiliary input 42, electrically connected to one of the connectors 15 inside the housing 1, upstream of the devices 20 also connected to this connector 15. In other words, within the housing 1, each connector 15 serves both one of the power switching devices 20 and one of the inputs 42 of the auxiliary switching device at the same time. In conduction configuration, each switch 41 electrically links its auxiliary input 42 to its auxiliary output 43. In isolation configuration, each switch 41 electrically isolates its auxiliary input 42 from its auxiliary output 43. The auxiliary output 43 of each switch 41 is electrically connected to the unit 30. Preferably, the unit 30 includes a conversion means, comprising a transformer for example, for the electronic unit 30 to effectively receive electrical energy with characteristics suited to its operation, derived from the electrical power supply.

The auxiliary switching device 40 also comprises a mechanical control 44, to switch the device 40 over between the conduction configuration and the isolation configuration. Here, the mechanical control 44 takes the form of a button, which can be displaced with respect to the housing 1, at right angles to the axis Y1, between a conduction position, shown in FIGS. 4, 5A, 5B, 7A and 7B, setting the device 40 to conduction configuration, and an isolation position, shown in FIGS. 9A and 9B, setting the device 40 to isolation configuration. Advantageously, a single control 44 actuates at the same time, in a synchronized manner, the three switches 41, between the conduction configuration and isolation configuration. Preferably, the control 44 comprises a spring, which, by elasticity, exerts a return force on the button, tending to return the control 44 to conduction position when it is in isolation position. In other words, the device 40 has a monostable, normally closed, configuration.

When the device 40 is in conduction configuration, the electronic unit 30 is operative and can control the devices 20. When the device 40 is in isolation configuration, the electronic unit 30 is deactivated, and is no longer able to control the devices 20. Then, it is advantageously possible to provide for the devices 20 to retain the state that they had before deactivation of the unit 30. Alternatively, provision can be made for the devices 20 to be monostable and automatically switch over to isolation configuration when the unit 30 is thus deactivated.

The unit 140 further comprises a lockout system, which comprises a lock 50 and, preferably, a slide 70. The lockout system moves between a lockout configuration, shown in FIGS. 9A to 11, and an operating configuration, shown in FIGS. 4 to 8. To move the lockout system between these two configurations, a technician manually actuates the lock 50, subject to certain conditions.

In lockout configuration, the lock 50 is positioned so as to mechanically keep the switches 23 and the device 40 in isolation configuration. Thus, the setting to lockout configuration simultaneously locks out the electronic control unit 30 and the devices 20. It is not possible to lock out the unit 30 without locking out the devices 20 and vice versa. In this lockout configuration, the units 138 and the loads 104 are electrically isolated from the electrical power supply by the switches 23, in isolation configuration. In this lockout configuration, the unit 30 is deactivated because it is isolated from the electrical power supply by the device 40. Thus, it is not possible for the unit 30 to order the electrical actuators 28 to set the switches 23 to conduction configuration. Furthermore, optionally, the deactivation of the unit 30 also sets the electronic switches 24 to isolation configuration, because the electronic switches 24 need to receive an electrical power supply from the unit 30 to be in conduction configuration.

In operating configuration, the lock 50 is positioned so as to allow the switches 23 to be displaced between the isolation configuration and the conduction configuration, notably on command from the electronic control unit 30, and allows the auxiliary switching device 40 to move between the conduction configuration and the isolation configuration. Since the auxiliary switching device 40 is preferentially normally closed, it is automatically in conduction configuration when it is not kept in isolation configuration by the lockout system, such that, in operating configuration, the electronic control unit 30 is active to control the devices 20.

Provision is also made, when the switches 23 are in conduction configuration, for the lockout system to be necessarily in operating configuration. In this operating configuration, via the switches 23 in conduction configuration, the electrical actuators 28 mechanically prevent the lockout system from being set to lockout configuration, by mechanically preventing a displacement of the lock 50. This prevents a technician from being able to set the lockout system to lockout configuration by actuation of the lock 50, while the electrical power supply delivers electrical power to the units 138. On the other hand, in isolation configuration, the electrical actuators 28, via the switches 23, mechanically allow the lock 50 to be displaced for the lockout system to be able to switch over to lockout configuration.

A more detailed description of the structure of the lockout system is explained hereinbelow, for the embodiment of FIGS. 4 to 12.

The lock 50 mechanically interacts with the switches 23 via the slide 70. The slide 70 is entirely received inside the housing 1, by being supported by the housing 1. The slide 70 is slidingly movable with respect to the housing 1, along the axis Y1, preferentially without rotation. The slide 70 is attached to all the mechanical switches 23 of the unit 140. To this end, the slide 70 here comprises three actuation arms 71, each arm 71 being attached to one of the slides 27. More generally, as many arms 71 are provided as there are slides 27. For the embodiment of FIGS. 4 to 12, the slide 70 moves integrally in translation along the axis Y1 with respect to the housing 1 with the slides 27. In other words, the slide 70 is able to simultaneously drive all the switches 23, via their respective slide 27, between the conduction configuration and the isolation configuration. Conversely, the switches 23 are able to drive the slide 27 when they switch over between the isolation configuration and the actuation configuration, notably under the action of the electrical actuators 28.

The slide 70 advantageously also comprises a main arm 72, via which the slide 70 is slidingly guided by the housing 1. The arm 72 is advantageously centred on the axis X71. One end of the arm 72 bears the arms 71, which are attached to it in the manner of a trident. At the opposite end of the arm 72, the slide 70 cooperates mechanically with the lock 50. The arms 71 and 72 are advantageously disposed in a plane at right angles to the direction X, that is to say parallel to the axis Y1.

Figure 6:
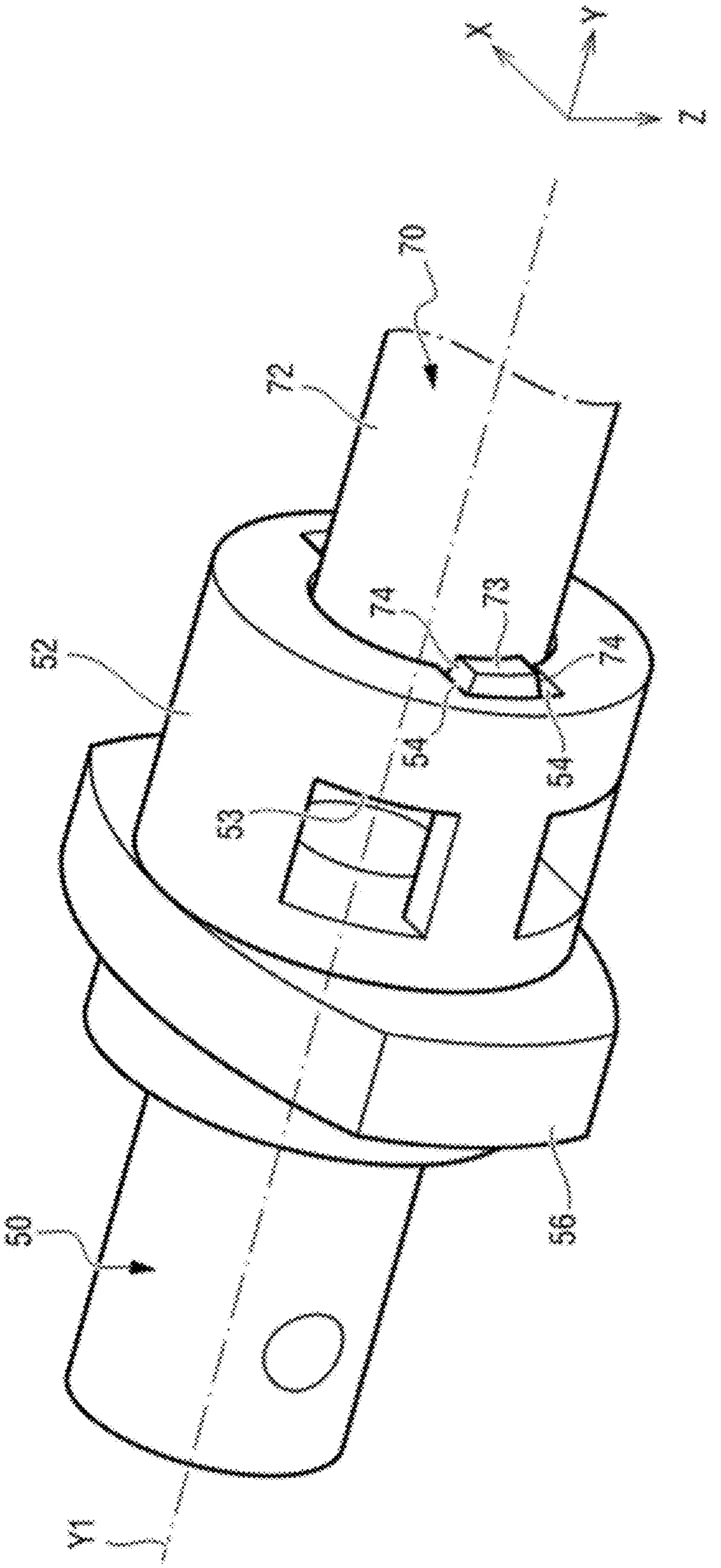
FIG. 6 is a partial perspective view of a lock and of the slide in the configuration of FIGS. 4, 5A and 5B.
Figure 7A:
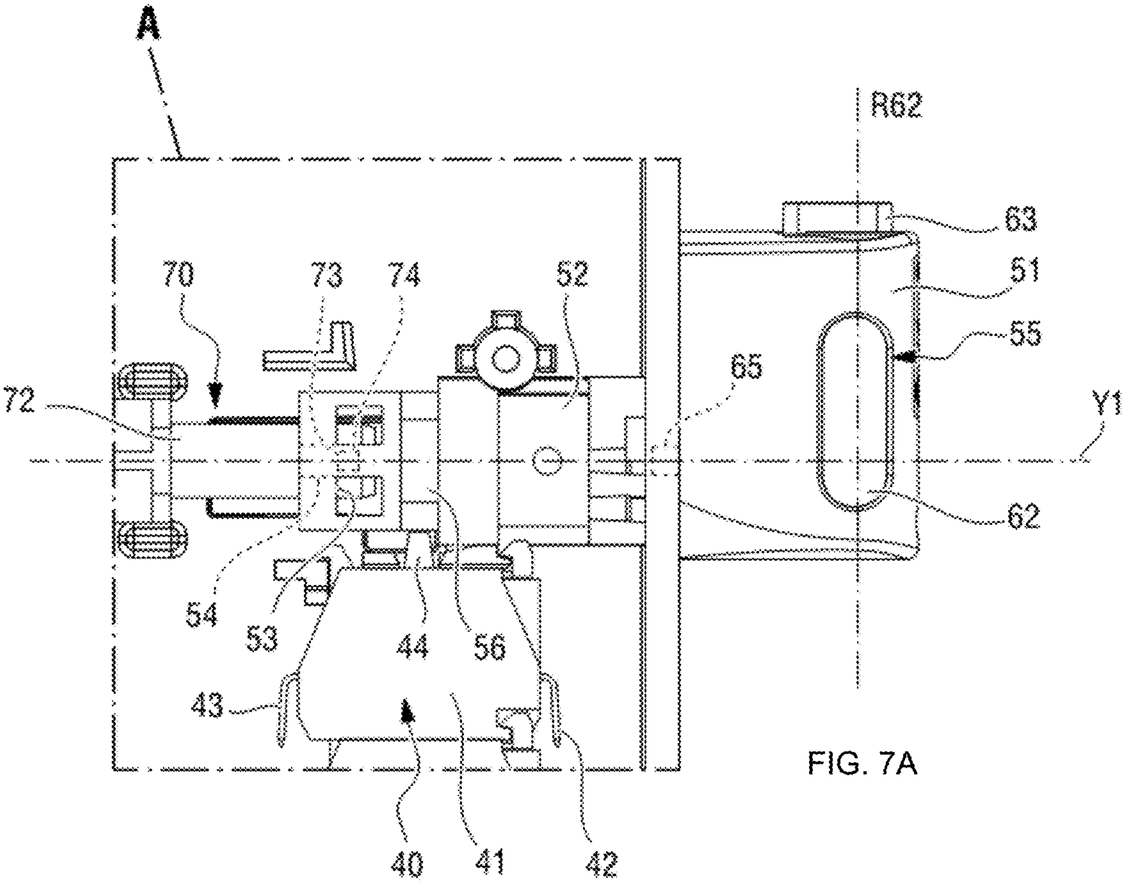
FIG. 7A shows the detail A of FIG. 4
Figure 7B:
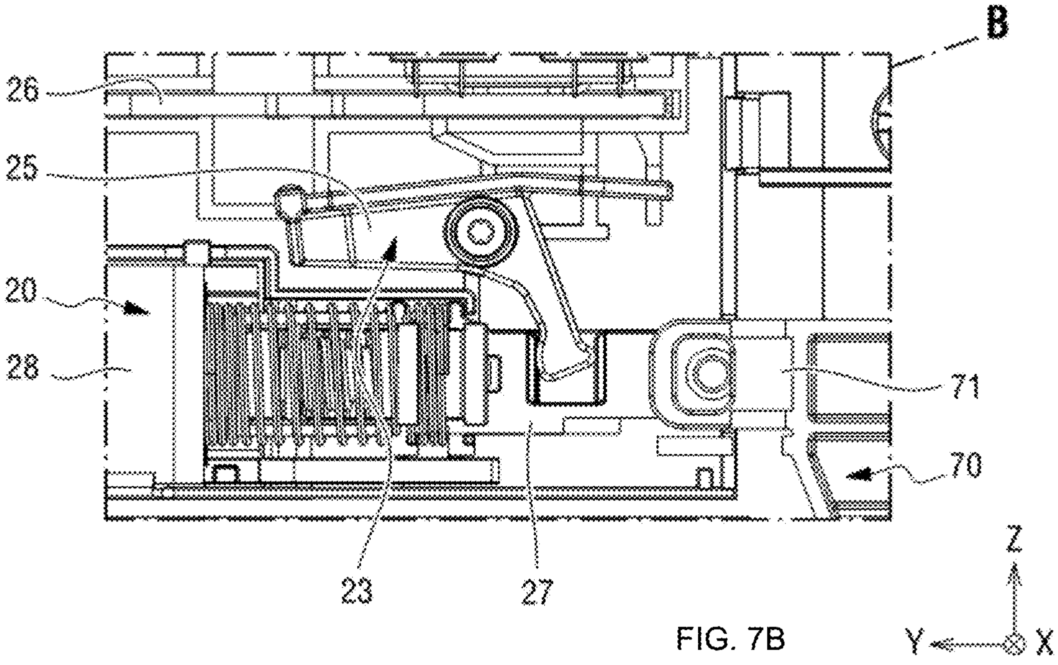
FIG. 7B shows the detail B of FIG. 4, in which the protection unit is in an operating configuration, with the mechanical contacts in isolation configuration and the slide in authorization position.
Figure 8:
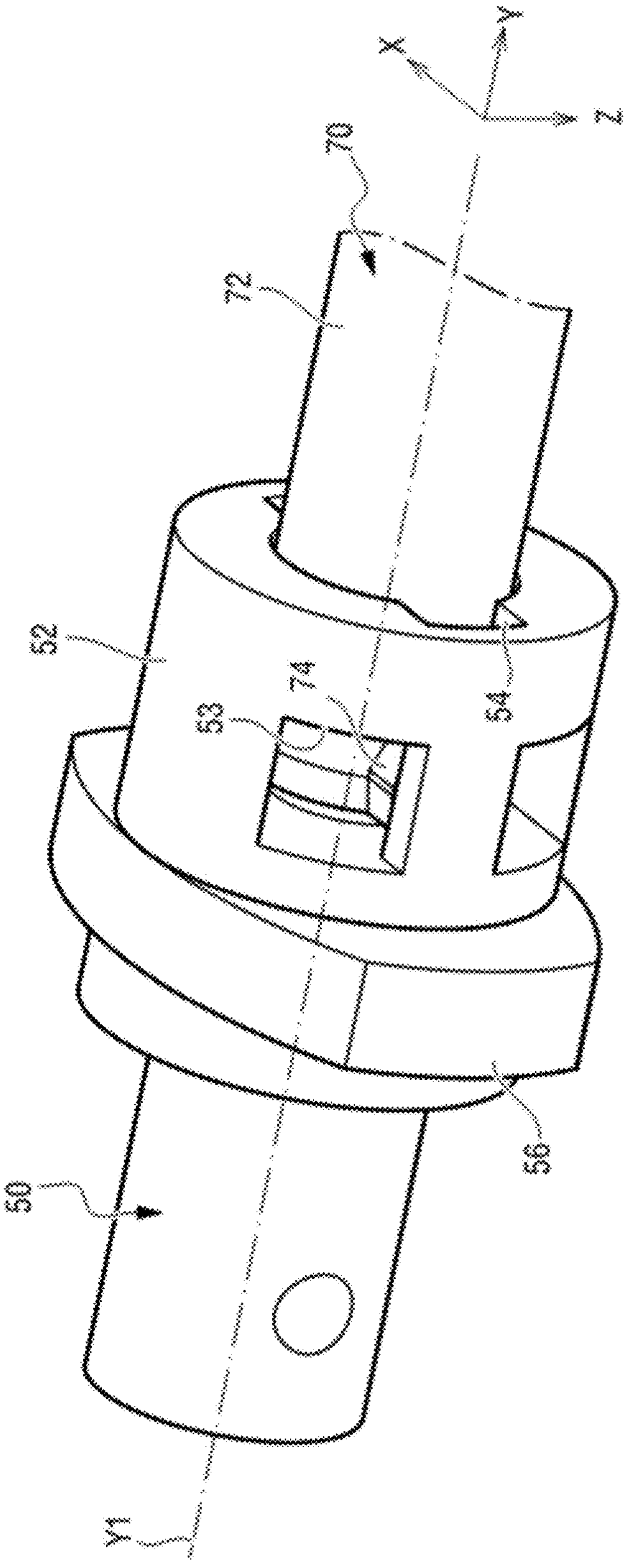
FIG. 8 is a partial perspective view of the lock and of the slide in the configuration of FIGS. 7A and 7B.

For the embodiment of FIGS. 4 to 12, the slide 70 is movable between a position called "prevention position", shown in FIGS. 4 to 6, and a position called "authorization position", shown in FIGS. 7A, 7B and 8. The slide 70 slides between these prevention and authorization positions while the lockout system is in the operating configuration. In prevention position, the slide 70 is positioned in the direction Y with respect to its authorization position. For this embodiment, the retaining position is distinct from the authorization and retaining position.

Figure 9A:
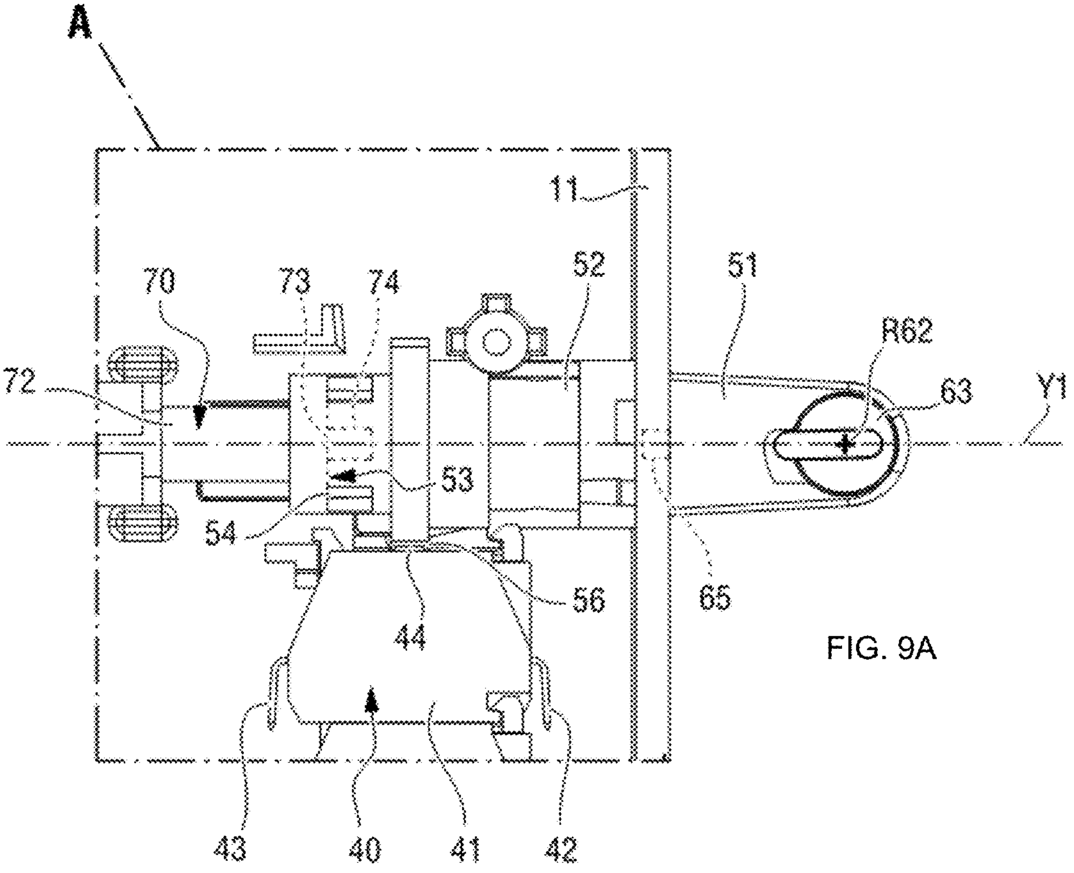
FIG. 9A shows the detail A of FIG. 4
Figure 9B:
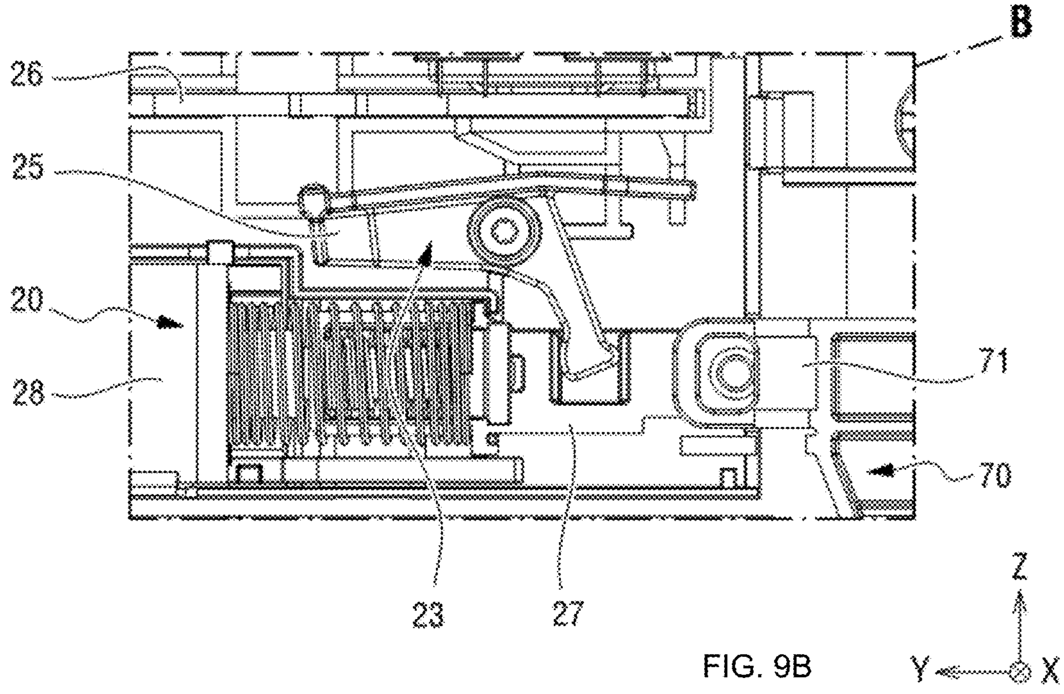
FIG. 9B shows the detail B of FIG. 4, in which the protection unit is in a lockout configuration, with the mechanical contacts in isolation configuration, the slide in retaining position and the lock in lockout position.
Figure 10:
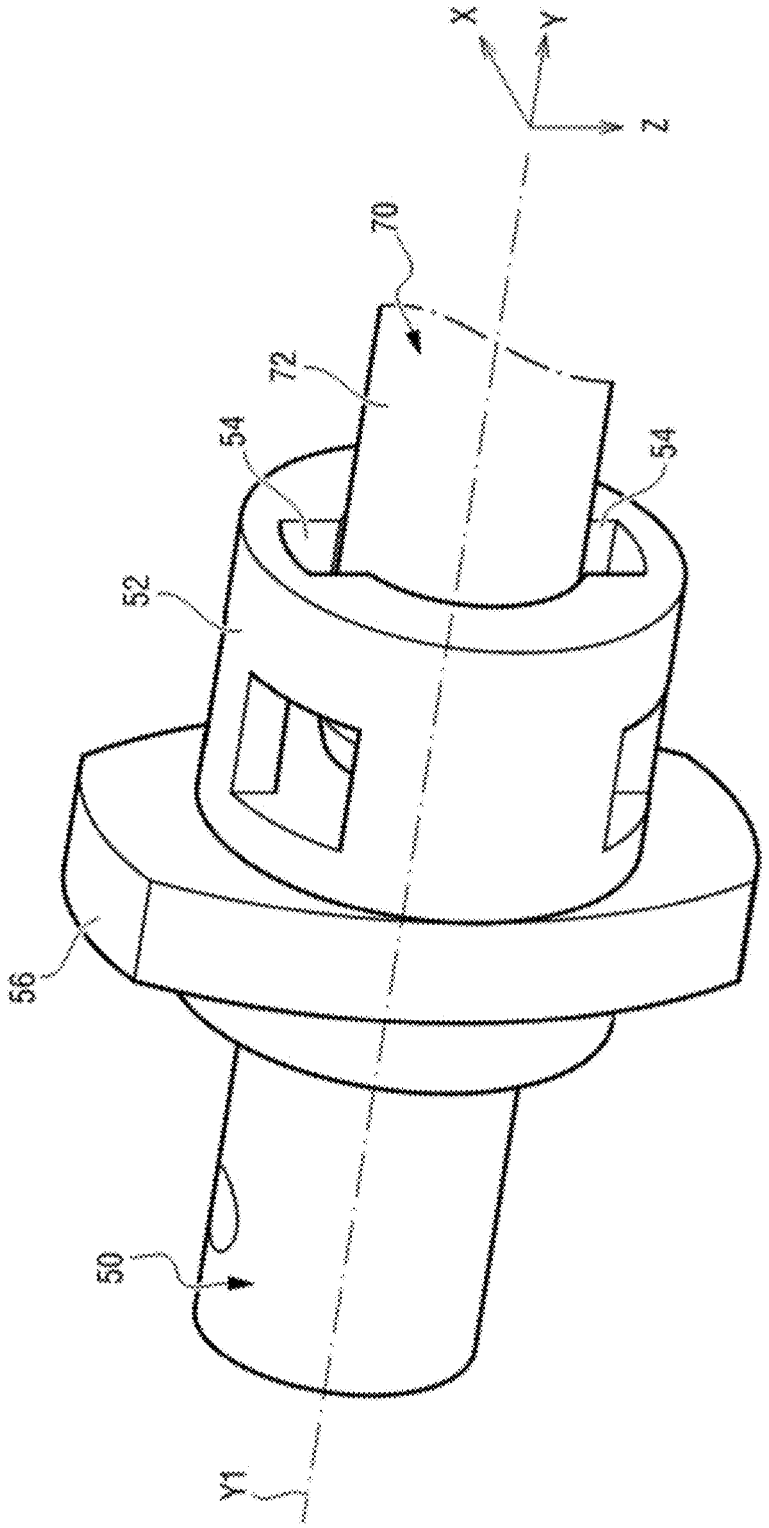
FIG. 10 is a partial perspective view of the lock and of the slide in the configuration of FIGS. 9A and 9B.

For the embodiment of FIGS. 4 to 12, the authorization position coincides with a "retaining position" of the slide 70, shown in FIGS. 9A, 9B and 10. The retaining position, here identical to the authorization position, is adopted when the lockout system is in lockout configuration.

For the embodiment of FIGS. 4 to 12, the slide 70 is set to prevention position by the switches 23 via the slides 27, under the action of the electrical actuators 28, when the switches 23 are in conduction configuration, and in the authorization position, via the slides 27, when the switches 23 are in isolation configuration.

For the embodiment of FIGS. 4 to 12, the lock 50 is borne by the housing 1, in particular by the front face 11. Here, the lock 50 is movable exclusively in rotation about the axis Y1, between a lockout release position, which is therefore a lockout release orientation, shown in FIGS. 4 to 8, and a lockout position, which is therefore a lockout orientation, shown in FIGS. 9A to 11. In other words, the lock 50 is fixed in translation with respect to the housing 1 along the axis Y1. The lockout release position is adopted when the lockout system is in operating configuration. The lockout position is adopted when the lockout system is in lockout configuration. The lockout position and the lockout release position are distinct. Provision is advantageously made, between these two positions, for the lock 50 to perform less than a complete turn about the axis Y1, here for example a quarter turn.

An outer part 51 of the lock extends out of the housing 1, for the lock to be able to be actuated between the lockout release position and the lockout position by the technician, in order to switch over the lockout system between the operating configuration and the lockout configuration. An inner part 52 of the lock extends inside the housing 1 to cooperate mechanically with the devices 20, preferably via the slide 70, and with the device 40, preferably directly.

FIGS. 6, 8 and 10 show in more detail the way in which the inner part 52 of the lock 50 and the main arm 72 of the slide 70 cooperate mechanically.

In the example, the end of the arm 71 of the slide 70 is received inside the inner part 52 of the lock 50, coaxially with the axis X71. To this end, the part 52 forms a conduit, which is open in the direction Y, to accommodate the end of the arm 72.

The slide 70 and the lock 50 comprise axial stops, called "primary axial stops" and rotation stops. To form these stops, the slide 70 comprises, for example, one or more splines in relief while the lock 50 comprises, inside the conduit receiving the slide 70, one or more corresponding hollowed-out splines, and as many retaining shoulders. Here, two diametrically opposite relief splines and two corresponding diametrically opposite hollowed-out splines are provided. Also provided are two diametrically opposite retaining shoulders, which are disposed between the hollowed-out splines about the axis Y1, at a quarter turn. About the axis Y1, each retaining shoulder links the two hollowed-out splines together and each hollowed-out spline links the two retaining shoulders.

One of the relief splines of the slide 70 is visible in FIGS. 6, 8 and 10, and is formed at the end of the arm 72, parallel to the axis Y1, to be received inside the lock 50.

Each relief spline forms a primary axial stop 73, which is a surface at right angles to the axis Y1, turned towards the direction Y.

Each relief spline forms two rotation stops 74, which are surfaces parallel or orthoradial to the axis Y1, to prevent a rotation. For one and the same relief spline, the stops 74 are turned in mutually opposite directions.

In addition to the primary axial stop 73, each retaining shoulder forms a respective primary axial stop 53, by forming a surface at right angles to the axis Y1, turned in the opposite direction to the direction Y.

In addition to the rotation stops 74, each hollowed-out spline forms two rotation stops 54, which are surfaces parallel or orthoradial to the axis Y1, to prevent a rotation. For one and the same hollowed-out spline, the stops 54 face one another.

As shown in FIGS. 4 to 6, when the slide 70 is in prevention position, which can occur only in operating configuration, the relief and hollowed-out splines are received in one another, which allows the slide 70 to slide with respect to the lock 50 and the housing 1 along the axis Y1, while preventing the rotation of the lock 50 with respect to the slide 70 and to the housing 1 about the axis Y1. Indeed, since the splines are received in one another, the rotation stops 54 face the rotation stops 74 and prevent the rotation of the lock 50 with respect to the slide 70 about the axis Y1 by coming into anti-rotation abutment. In other words, the rotation stops 54 are at the same height as the stops 74 along the axis Y1 to prevent the lock 50 from being set to lockout position.

As shown in FIGS. 7A to 10, when the lockout system is in operating configuration with the slide 70 in authorization position and when the lockout system is in lockout configuration with the slide 70 in retaining position, here identical to the lockout position, the relief splines have crossed the hollowed-out splines, because of the sliding of the slide 70 in the direction opposite to the direction Y with respect to the lock 50. Then, the rotation of the lock 50 is no longer prevented, because the rotation stops 54 and 74 are axially offset along the axis Y1, that is to say are at different heights along the axis Y1. In particular, the stops 54 are in the direction Y with respect to the stops 74, the relief splines of the slide 70 then being received in a radially widened part of the conduit of the lock 50 in which they do not encounter any obstacle during rotation of the lock 50. Then, with the splines thus released, the slide 70 allows the lock 50 to pivot about the axis Y1 between the lockout orientation and the lockout release orientation.

In operating configuration, as shown in FIGS. 4 to 8, the axial stops 53 and 73 are disposed so as to be offset with respect to one another about the axis Y1. In this case, the stops 73 are disposed at a quarter turn about the axis Y1 with respect to the stops 53, since the lock 50 is in lockout release orientation. In the case of FIGS. 4 to 6 in which the slide 70 is in prevention position, the stops 53 and 73 are not at the same height along the axis Y1. In particular, the stops 73 are in the direction Y with respect to the stops 53. In the case of FIGS. 7A, 7B and 8, the stops 53 and 73 are at the same height parallel to the axis Y1, but are misaligned so as to not enter into abutment when the slide 70 is driven to the prevention position. By virtue of these dispositions concerning the stops 53 and 73, in operating configuration, the slide 70 is allowed to slide between the prevention and authorization positions under the action of the electrical actuators 28, via the switches 23.

As shown in FIGS. 9A, 9B and 10, in lockout configuration, the primary axial stops 53 and 73 are disposed so as to be facing one another parallel to the axis Y1. The result thereof is that the lock 50 retains the slide 70 in retaining position, by preventing the slide from sliding in the direction Y. Then, the devices 20 do not have the possibility of drawing the slide 70 and of switching over to conduction configuration. In practice, in this configuration, not only have the relief splines of the slide 70 crossed the hollowed-out splines of the lock 50, but also the lock 50 has pivoted with respect to the slide 70 such that the relief splines are axially facing the corresponding retaining shoulders. Then, the axial stops 73, formed by the relief splines, come to bear in the direction Y against the axial stops 53, formed by the retaining shoulders, such that the lock 50 axially retains the slide 70.

For the embodiment of FIGS. 4 to 12, the slide 70 can be returned to the prevention position directly by the devices 20 via the mechanical switches 23, while the slide 70 has been released from its retaining position by displacement of the lock 50 to the lockout release position.

As a variant, depending on the characteristics of the electrical actuators 28 and of the switches 23 selected, a spring can be provided, called "slide spring", which exerts an elastic force on the slide 70 parallel to the axis Y, by bearing on the housing 1, tending to displace the slide 70 to the prevention position while the slide 70 is in retaining position.

Provision is advantageously made for the lock 50 to mechanically actuate the device 40 without any intermediate part, as shown in FIGS. 4 to 12. For this, the lock 50 advantageously comprises a ramp 56. The ramp 56 takes the form of a cam, which is radial with respect to the axis Y1 and is, here, in relief. The ramp 56 is formed on the inner part 52 of the lock 50.

Whatever the orientation of the lock 50, the ramp 56 is disposed at the height of the control 44 along the axis Y1. As shown in FIGS. 4 to 8, the ramp 56 is turned away from the mechanical control 44, here by a quarter turn, when the lock 50 is in the lockout release orientation, so as to not actuate the control 44. In other words, the ramp 56 is disengaged from the mechanical control 44 of the device 40 when the lockout system is in operating configuration. The control 44 then freely assumes the position corresponding to the conduction configuration of the device 40, for example under the action of the internal spring of the device 40.

As shown in FIGS. 9A, 9B and 10, while the lock 50 is in the lockout orientation, the ramp 56 is turned so as to press against the control 44, radially outwards, notably against the action of the internal spring of the device 40, if provided. Since the control 44 is thus actuated by the ramp 56 of the lock 50, the device 40 is in isolation configuration.

On the outside of the housing 1, the outer part 51 of the lock 50 comprises a lockout orifice 55 which, when it is not masked, is configured to receive one or more padlocks 61. More specifically, it is a respective locking shackle of each padlock which is received in the orifice 55, as shown in FIG. 11.

Figure 11:
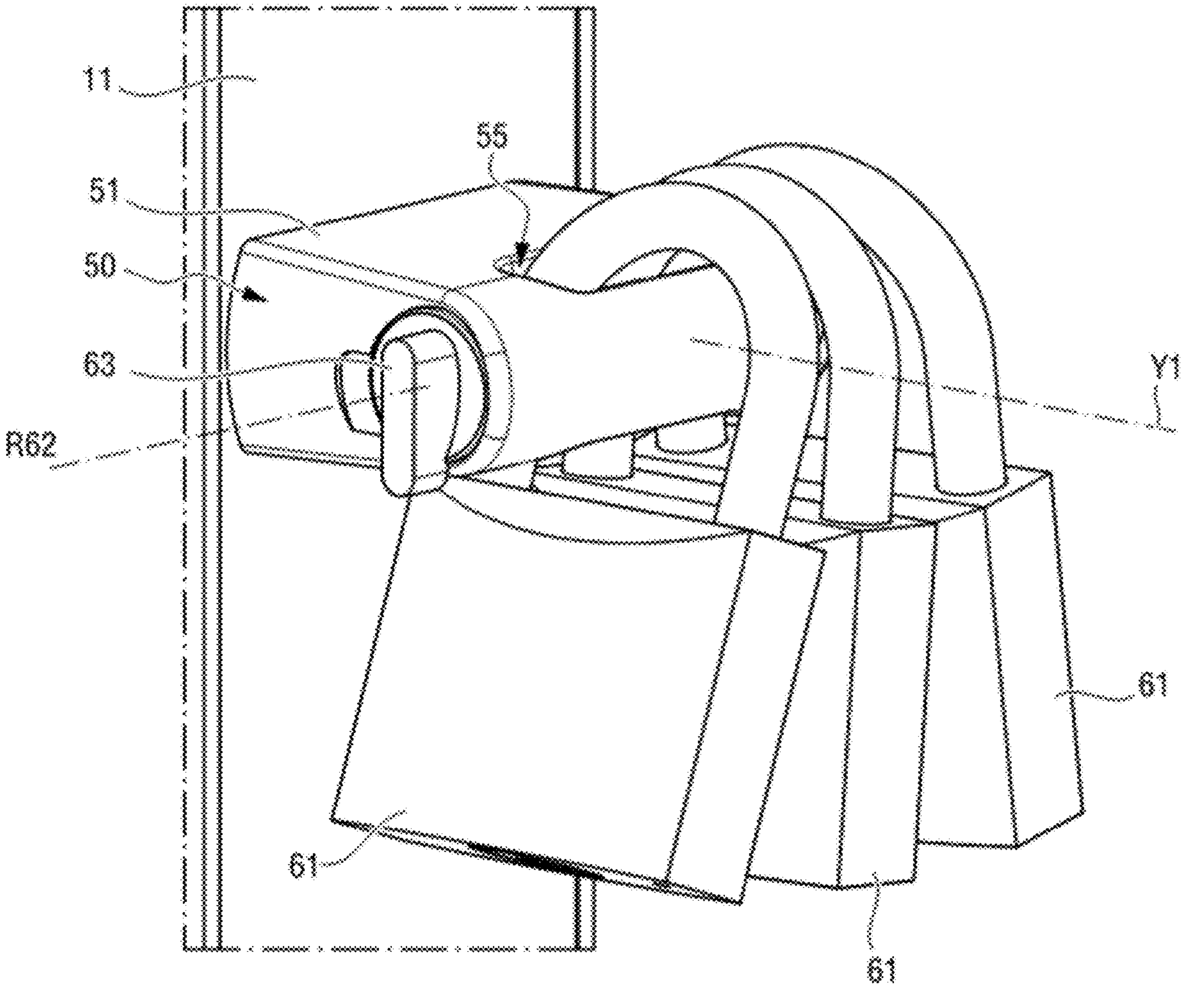
FIG. 11 is a partial perspective view of the lock.
Figure 12:
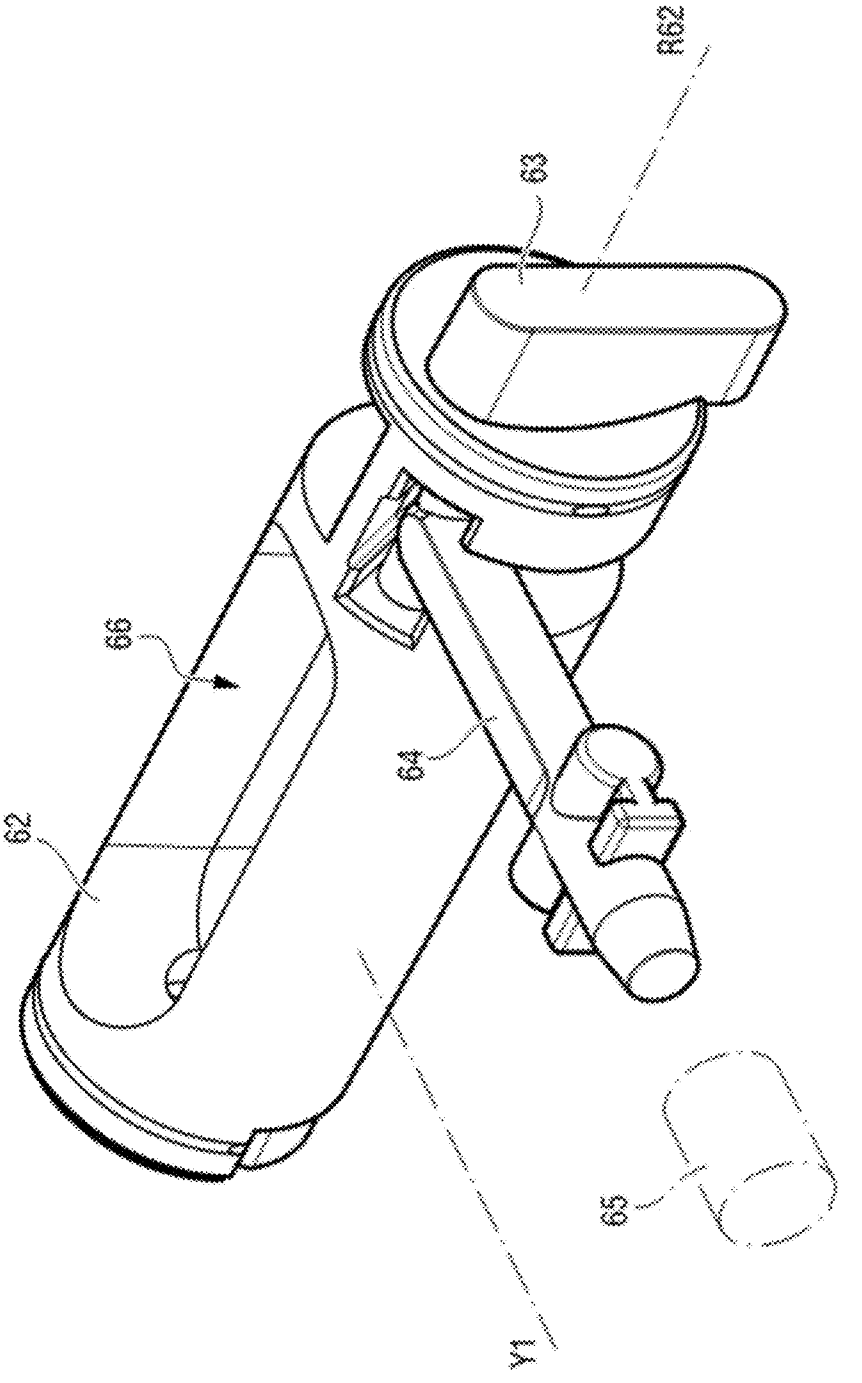
FIG. 12 is a perspective view of a lock masking system.

The lockout system also comprises a masking system, visible notably in FIGS. 11 and 12, here comprising a shutter 62, a finger 64 and a locking orifice 65.

The shutter 62 is mounted on the outer part 51 of the lock 50, by being movable with respect to the outer part 51, between a masking position in which the shutter 62 masks the lockout orifice 55, as shown in FIGS. 5A, 5B, 7A, 7B, 9A and 9B, to prevent the lockout orifice 55 from receiving the padlocks 61, and a release position, as shown in FIG. 11, in which the shutter 62 releases the lockout orifice 55 for the orifice 55 to be able to receive the padlocks 61. To be thus movable, the shutter 62 for example pivots with respect to the lock 50 about an axis R62 that is fixed with respect to the lock 50, the axis R62 being radial or at right angles with respect to the axis Y1. When the lock is in lockout position, the technician can actuate the shutter 62 using a manual control, here a button 63.

When the padlocks 61 are received in the orifice 55 with the shutter 62 in release position, the padlocks 61 prevent the shutter 62 from being set to masking position, by mechanical cooperation between the padlocks 61 and the shutter 62. For example, the padlocks pass through an orifice 66 belonging to the shutter 62, which is diametral with respect to the axis R62 and which is aligned with the orifice 55 when the shutter 62 is in release position. In masking position, the orifice 66 is itself masked inside the outer part 51 of the lock 50. The orifice 66 can be seen better in FIG. 12, in which the masking system is represented on its own.

The finger 64 is mounted within the lock 50, and is movable in a way that is subject to the shutter 62. When the shutter 62 is in release position, the finger 64 is in a locking position, in which the finger 64 protrudes in the direction Y. When the shutter 62 is in masking position, the finger 64 is retracted in the direction opposite to the direction Y. To be thus displaced by the shutter 62, provision is for example made for one of the ends of the finger 64 to be linked to the shutter 62 by a pivot link, about an axis that is parallel to and does not coincide with the axis 62, in the manner of a crank handle, and for the other end of the finger 64 to be guided in sliding at its opposite end by a guide formed inside the lock 50, parallel to the axis Y1.

The locking orifice 65 is for example formed in the front face 11 of the housing 1. In FIGS. 5A, 5B, 7A, 7B, 9A, 9B and 12, the orifice 65 is represented transparently by broken lines. The orifice 65 emerges on the outside of the housing 1, by being positioned at a distance from the axis Y1. Here, the axis Y1 is situated in the direction X with respect to the orifice 65.

When the lock 50 is in lockout position, the lock 50 is positioned such that the end of the finger 64 is aligned with the orifice 65. Then, the finger 64 is allowed to be displaced between the unlocking position and the locking position, by actuation of the shutter 62 respectively between the masking position and the release position.

In locking position, the finger 64 is received in the orifice 65, such that the finger 64 locks the orientation of the lock 50, keeping it in the lockout orientation. By introducing the padlocks 61 into the orifice 55 of the lock 50, blocking the shutter 62 in release position, the shutter 62 blocks the finger 64 in locking position in the orifice 65, which blocks the lock 50 in lockout position.

When the lock 50 is in lockout release position, the finger 64 is no longer facing the orifice 65. Then, the finger 64 is prevented from being in locking position by the front face 11, and is therefore necessarily in unlocking position. Positioned thus, the finger 64 keeps the shutter 62 in masking position. Thus, in lockout release position, the shutter 62 cannot be set to release position and the padlocks 61 cannot be received in the orifice 55.

To set the lock 50 to lockout release position, the padlocks 61 must first be removed from the orifice 65, which allows the shutter 62 to be displaced to the release position. With the shutter 62 in release position, the finger 64 is in unlocking position. When the finger 64 is in unlocking position, it is disengaged from the orifice 65, such that the masking system no longer opposes the pivoting of the lock 50 between the lockout and lockout release positions.

Ultimately, the masking system is configured so that, when the padlocks 61 are received, the lock 50 cannot be set to lockout release position and so that, when the padlocks 61 are removed, the technician can set the lock to lockout release position by actuating the masking system, in this case the shutter 62. Then, the padlocks 61 can be put in place on the lock 50 again only if the lock 50 is once again positioned in lockout position and the masking system is set to release position. This once again locks the lock 50 in lockout position.

FIGS. 13 to 17 show another embodiment, in which only the lockout system is modified compared to the embodiment of FIGS. 4 to 12. Apart from the differences mentioned below, all the features mentioned above for the embodiment of FIGS. 4 to 12 are valid for the embodiment of FIGS. 13 to 17, even if they are not repeated. The features that address the same functions or that are of the same nature in the embodiment of FIGS. 13 to 17, compared to the embodiment of FIGS. 4 to 12, are designated with the same reference signs augmented by 200.

The unit 140 of the embodiment of FIGS. 13 to 17 comprises a lock 250 and, preferably, a slide 270, forming the lockout system. The lockout system of FIGS. 13 to 17 moves between the lockout configuration, shown in FIGS. 16 and 17, and the operating configuration, shown in FIGS. 13, 14A and 14B. The lockout system also adopts an intermediate configuration shown in FIGS. 15A and 15B, which is intermediate between the operating and lockout configurations. To have the lockout system move between these configurations, a technician manually actuates the lock 250, subject to certain conditions.

In lockout configuration, the lock 250 is positioned so as to mechanically keep the switches 23 and the device 40 in isolation configuration. Thus, the setting to lockout configuration simultaneously locks out the electronic control unit 30 and the devices 20. It is not possible to lock out the unit 30 without locking out the devices 20, and vice versa. In this lockout configuration, the units 138 and the loads 104 are electrically isolated from the electrical power supply by the switches 23, in isolation configuration. In this lockout configuration, the unit 30 is deactivated because it is isolated from the electrical power supply received on the connectors 15 by the device 40. Thus, it is not possible for the unit 30 to order the electrical actuators 28 to set the switches 23 to conduction configuration. Furthermore, optionally, the deactivation of the unit 30 also sets the electronic switches 24 to isolation configuration, because the electronic switches 24 require an electrical power supply to be received from the unit 30 to be in conduction configuration.

In operating configuration, the lock 250 is positioned so as to allow the switches 23 to be displaced between the isolation configuration and the conduction configuration, notably on command from the electronic control unit 30, and allows the auxiliary switching device 40 to move between the conduction configuration and the isolation configuration. Since the auxiliary switching device 40 is preferentially normally closed, it is automatically in conduction configuration when it is not kept in isolation configuration by the lockout system, such that, in operating configuration, the electronic control unit 30 is active to control the devices.

Provision is also made, when the switches 23 are in conduction configuration, for the lockout system to be necessarily in operating configuration. In this operating configuration, when the switches 23 are in conduction configuration, the switches 23 mechanically prevent the lockout system from being set to lockout configuration, by retracting the lock 250 into the housing 1. This prevents a technician from being able to set the lockout system to lockout configuration by actuation of the lock 250, while the electrical power supply delivers an electrical power to the units 138. On the other hand, in isolation configuration, the switches 23 mechanically allow the lock 250 to be displaced for the lockout system to be able to switch over to lockout configuration.

A more detailed description of the structure of the lockout system is explained hereinbelow, for the embodiment of FIGS. 13 to 17.

The lock 250 interacts manually with the switches 23 via the slide 270. The slide 270 is entirely received inside the housing 1, by being supported by the housing 1. The slide 270 is movable by sliding with respect to the housing 1, along the axis Y1, preferentially without rotation. The slide 270 is attached to all the mechanical switches 23 of the unit 140, with arms 71, identical to the arms 71 of the slide 70.

The slide 270 also advantageously comprises a main arm 272, different from the main arm 72. The slide 270 is guided in sliding by the housing 1 via the arm 272. The arm 272 is advantageously centred on the axis X71. One end of the arm 272 bears the arms 71, which are attached to it in the manner of a trident. At the opposite end of the arm 272, the slide 270 cooperates mechanically with the lock 250. The arms 71 and 272 are advantageously disposed in a plane at right angles to the direction X, that is to say parallel to the axis Y1.

Figure 13:
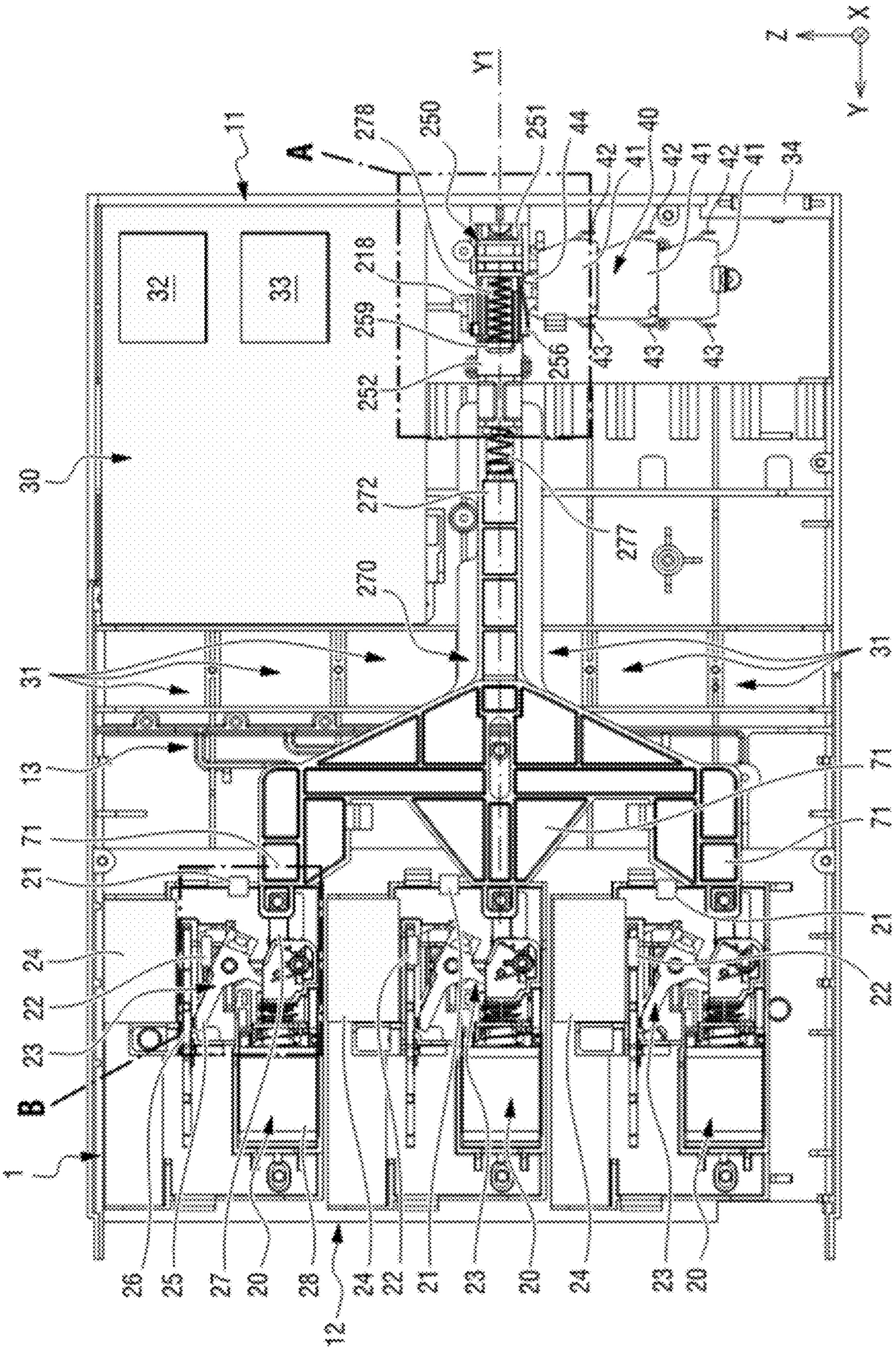
FIG. 13 is a side view showing the interior of a protection unit according to a second embodiment of the invention, in an operating configuration, with the mechanical contacts in conduction configuration and the slide in prevention position.
Figure 14A:
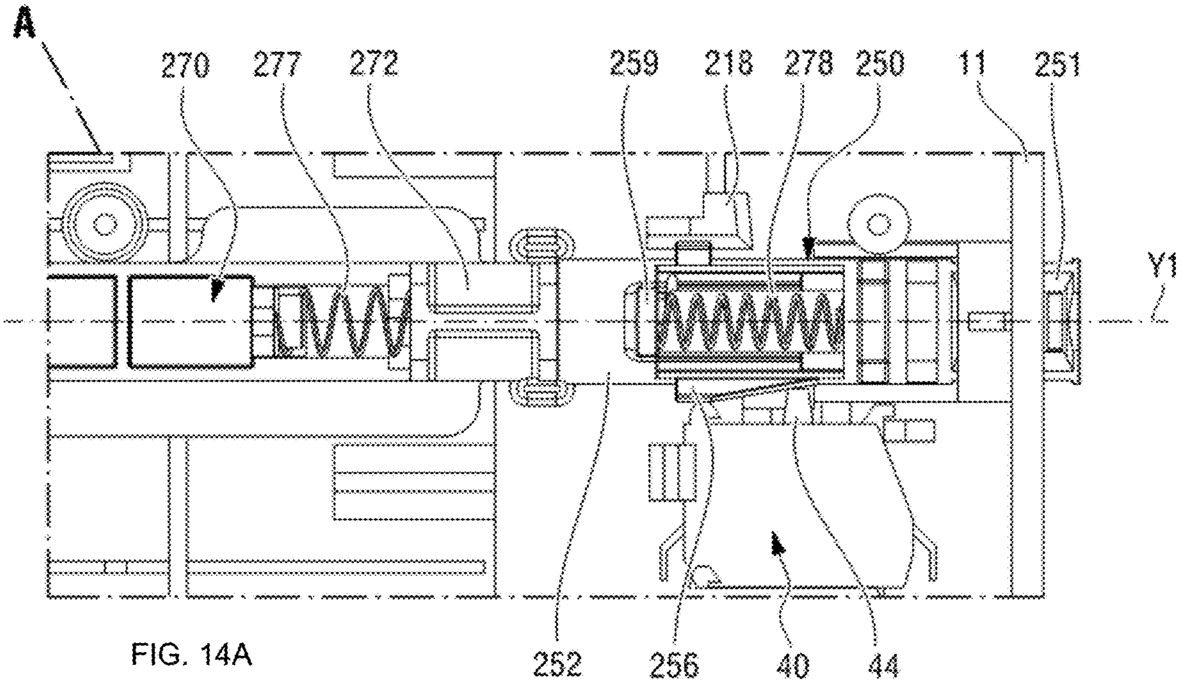
FIG. 14A shows a detail A of FIG. 13
Figure 14B:
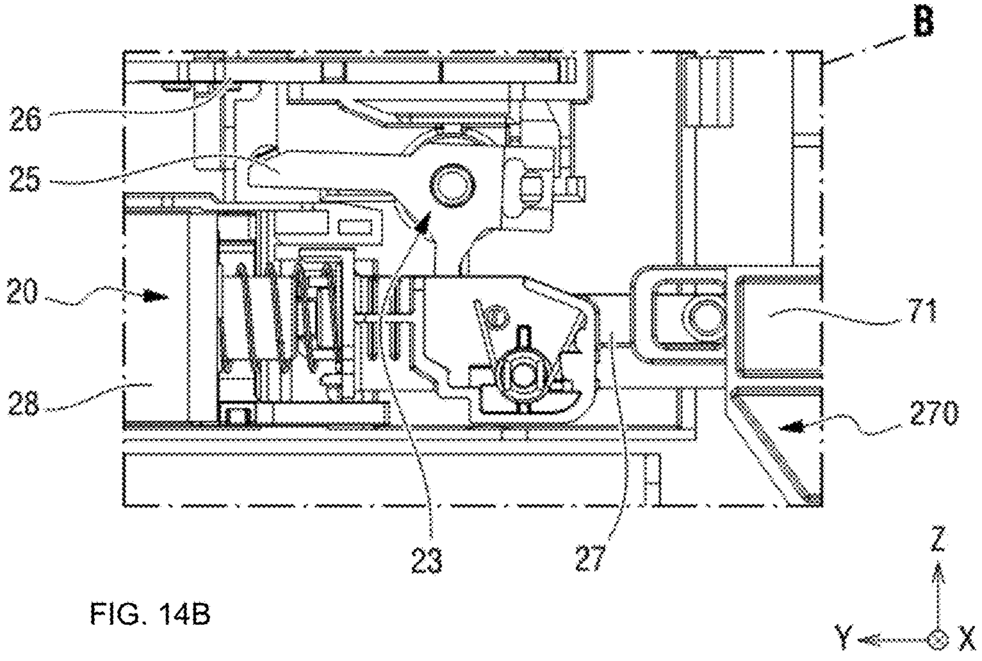
FIG. 14B shows a detail B of FIG. 13, while the protection unit is in an operating configuration, with the mechanical contacts in isolation configuration and the slide in authorization position.
Figure 15A:
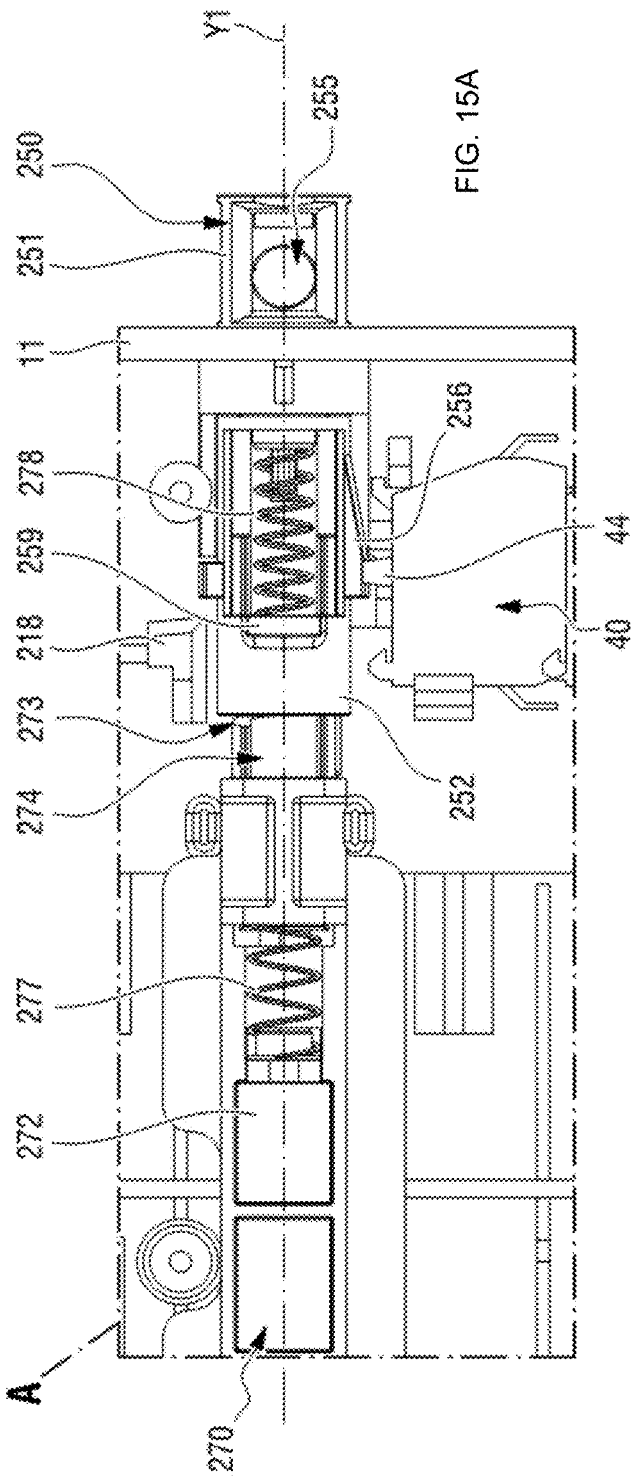
FIG. 15A shows the detail A of FIG. 13
Figure 15B:
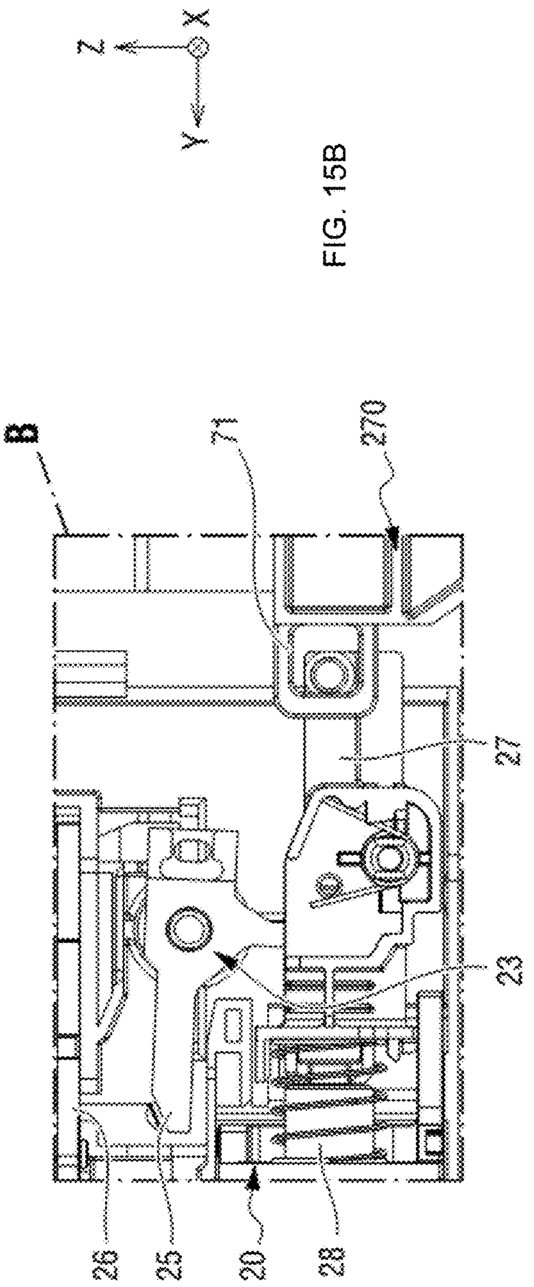
FIG. 15B shows the detail B of FIG. 13 while the protection unit is in an intermediate configuration, with the mechanical contacts in isolation configuration, the slide in retaining position and the lock in a lockout release orientation.
Figure 16:
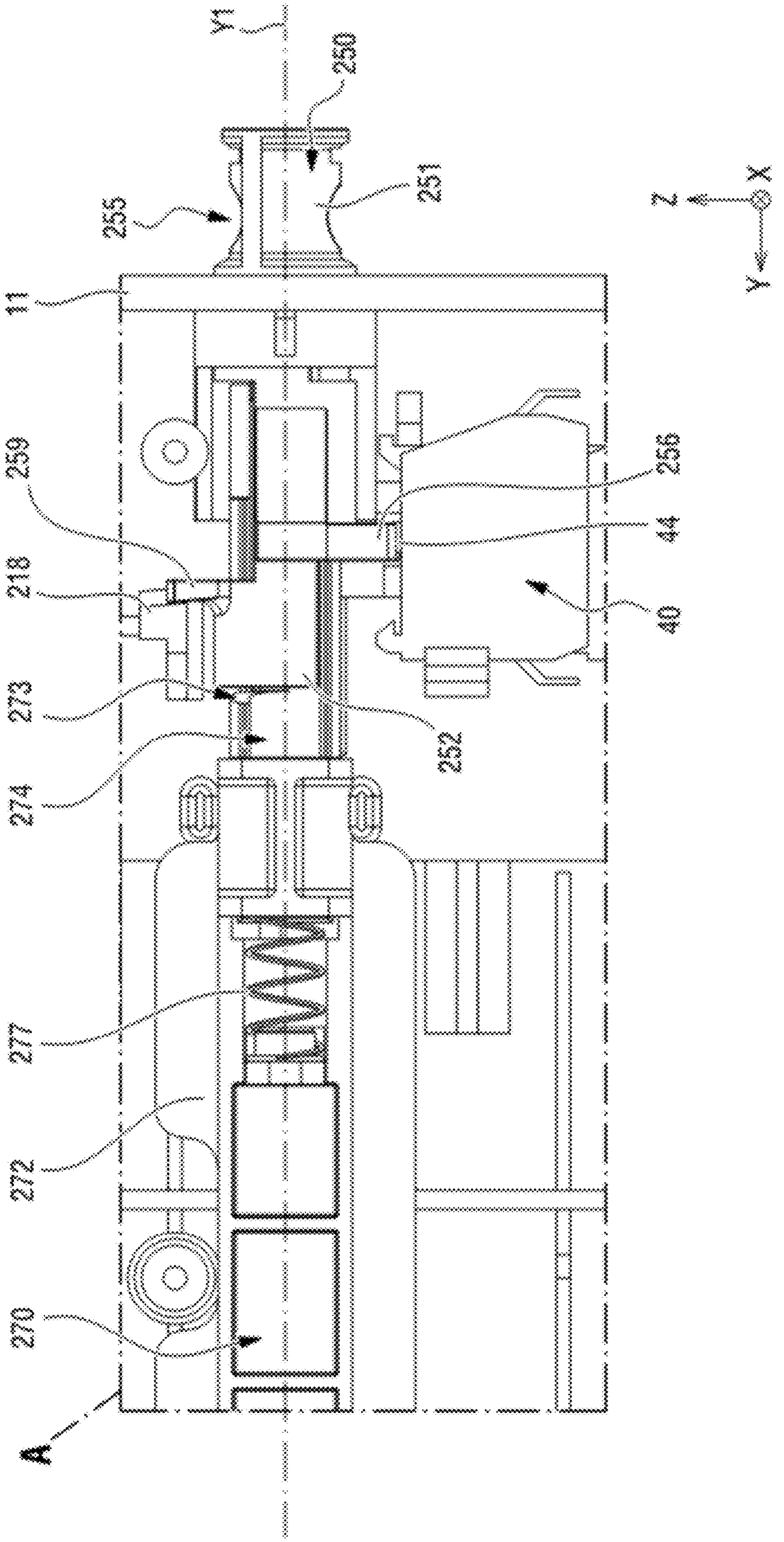
FIG. 16 shows the detail A of FIG. 13 while the protection unit is in a lockout configuration, with the mechanical contacts in isolation configuration, the slide in retaining position and the lock in lockout position.

In the direction Y, the slide 270 can be moved successively between a prevention position, shown in FIG. 13, an authorization position, shown in FIGS. 14A and 14B, and a retaining position, shown in FIGS. 15A, 15B and 16. These three positions are advantageously all distinct. The slide 270 slides between the prevention and authorization positions while the lockout system is in the operating configuration. The retaining position is adopted when the lockout system is in retaining configuration and, preferably, in intermediate configuration.

In operating configuration, the slide 270 is set to the prevention position by the switches 23 via the slides 27, under the action of the electrical actuators 28, when the switches 23 are in conduction configuration, and to the authorization position, via the slides 27, when the switches 23 are in isolation configuration.

Preferably, the lockout system comprises a spring 277, called "slide spring". The spring 277 exerts an elastic force on the slide 270, by bearing on the housing 1, tending to displace the slide 270 to the prevention position, when the slide 270 is in retaining position or in prevention position.

For the embodiment of FIGS. 13 to 17, the lock 250 is borne by the slide 270, namely by the arm 272, rather than by the housing 1, by being disposed in proximity to and/or through the front face 11. The lock 250 comprises an inner part 252, via which the lock 250 cooperates with the arm 272.

By cooperation of the arm 272 with the inner part 252, based on the position of the lock 250 with respect to the slide 270, the lock 250 is allowed either to slide along the axis Y1 with respect to the slide 270, or to pivot with respect to the slide 270 about the axis Y1, as follows.

The lock 250 is movable by sliding with respect to the slide 270 along the axis Y1, between an initial height, shown in FIGS. 13, 14A and 14B, adopted in operating configuration, and a lockout height, shown in FIGS. 15A, 15B and 16, adopted in intermediate configuration and in lockout configuration. When the lock 250 slides with respect to the slide 270 and/or when the slide 270 slides with respect to the housing 1, the lock 250 is translated with respect to the housing 1 along the axis Y1.

When the lock 250 is at the initial height with respect to the slide 270, the lock 250 is fixed in rotation about the axis Y1 with respect to the slide 270, in a lockout release orientation. The lockout release orientation is shown in FIGS. 13 to 15B.

When the lock 250 is at the lockout height with respect to the slide 270, the lock 250 pivots between the lockout release orientation, as shown in FIGS. 15A and 15B, and the lockout orientation, shown in FIG. 16. When the lock 250 is simultaneously in the lockout orientation and at the lockout height, the lock 250 is in lockout position. Provision is advantageously made, between the lockout release orientation and the lockout orientation, for the lock 250 to have performed at least one complete turn about the axis Y1, here for example a quarter turn.

Preferably, when the lock 250 is in the lockout position, that is to say at the lockout height and in the lockout orientation, the lock 250 is fixed in translation with respect to the slide 270 along the axis Y1. Ultimately, the lock 250 can slide with respect to the slide 270 only in the lockout release orientation, and can pivot with respect to the slide 270 only by being positioned at the lockout height.

When the lock 250 is positioned at the lockout height, the lock 250 arrives in axial abutment against the slide in the direction opposite the direction Y. Consequently, when the lock 250 is slid in the direction opposite the direction Y and the lockout height is reached, the lock 250 drives the slide 270 in the direction opposite the direction Y, by being set in axial abutment.

When the lock 250 is positioned at the initial height, the lock 250 arrives in axial abutment against the slide 270 in the direction Y.

Figure 17:
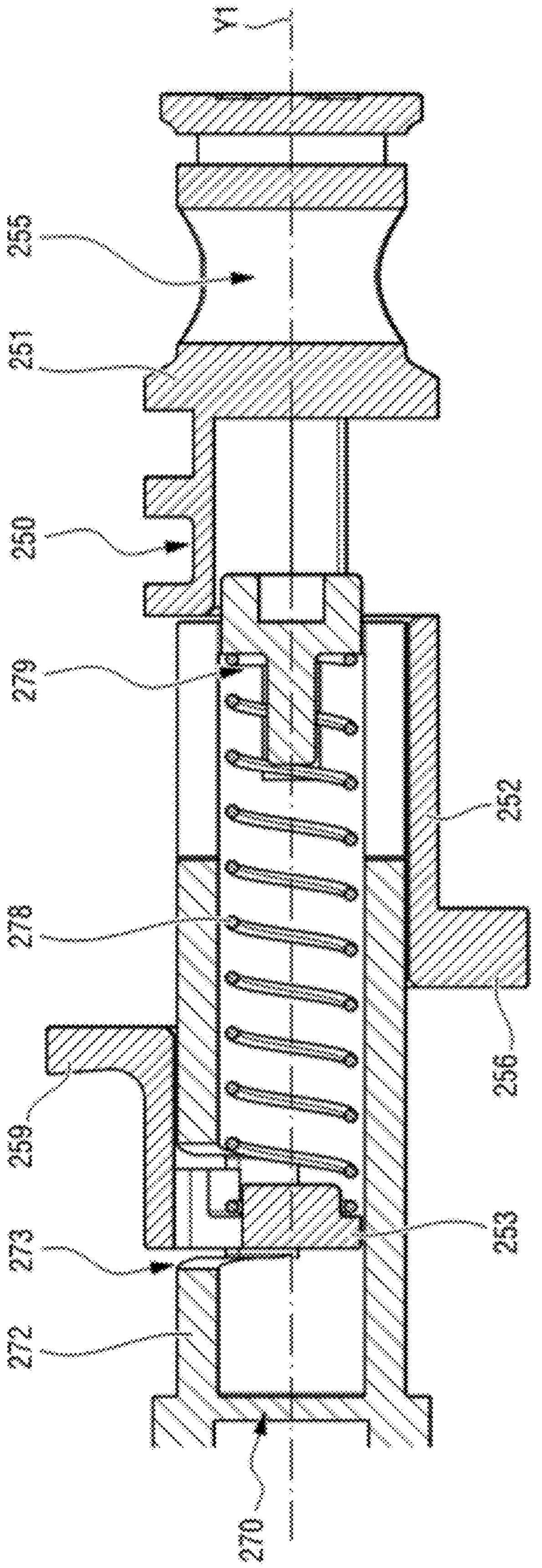
FIG. 17 is a longitudinal cross section of a part of the slide and of the lock in the configuration of FIG. 16.

As shown notably in FIG. 17, to guide the sliding and the pivoting of the lock 250 with respect to the slide 270, provision is for example made for the arm 272 to have a male tubular form coaxial with the axis Y1, which is received inside a cavity of complementary form, formed by the inner part 252. The male tubular form of the arm 272 is guided in sliding along the axis Y1 and in pivoting about the axis Y1 by the cavity of the inner part 252.

As shown in FIG. 17, to prevent the sliding of the lock 250 with respect to the slide 270, while allowing the pivoting of the lock 250 with respect to the slide 270, when the lock 250 is at lockout height and in lockout orientation, the inner part 252 of the lock 250 advantageously comprises an inner radial finger 253, which travels in a peripheral recess 273 formed by the arm 272 of the slide 270. To prevent the pivoting of the lock 250 with respect to the slide 270, while allowing the sliding of the lock 250 with respect to the slide 270, when the lock 250 is in the lockout release orientation and at the initial height, the inner radial finger 253, which travels in an axial groove 274 formed by the arm 272 of the slide 270. The axial groove 274 can be seen in FIGS. 15A, 15B and 16. The groove 274 extends in the direction Y, beginning from one end of the groove 273, such that the groove 274 and the recess 273 are disposed in an "L" configuration.

The groove 274 and the inner radial finger 252 constitute rotation stops, which are disposed so as to be at the same height along the main axis Y1, when the lockout system is in operating configuration with the slide in prevention position or in authorization position, for the slide 270 to keep the lock 250 in the lockout release orientation by the setting of the rotation stops in abutment about the axis Y1. The rotation stops 253 and 274 are at different heights along the axis Y1, when the lockout system is in lockout configuration and in intermediate configuration, for the slide 270 to allow the lock 250 to be pivoted between the lockout orientation and the lockout release orientation.

The lockout system advantageously comprises a spring 278, called "lock spring", which is for example housed between the lock 250 and the slide 270, coaxially with the axis Y1, inside the cavity formed by the inner part 252 of the lock 250.

The spring 278 exerts an elastic force on the lock 250, by bearing on the slide 270, tending to displace the lock 250 to the initial height, when the lock 250 is at the lockout height.

In other words, the spring 278 draws the lock 250 in the direction Y, by bearing on the slide 270. For example, as shown in FIG. 17, the spring 278 is a compression spring which bears in the direction Y on the lock 250, for example on the finger 253, and which bears in opposite direction on the slide 270, for example on an axial wall 279 at the end of the arm 272. In operating configuration, the switches 23 drive an integral sliding along the axis Y1 of an assembly composed of the lock 250 and the slide 270, by driving the slide 270, between the prevention position, when the switches 23 are in conduction configuration, and the authorization position, when the switches 23 are in isolation configuration. During this sliding, the spring 278 keeps the lock 250 at the initial height, with respect to the slide 270.

For the embodiment of FIGS. 13 to 17, the lock 250 comprises an outer radial lug 259, which is borne by the inner part 252. The housing 1 comprises a lug 218, which is formed inside the housing 1 in proximity to the inner part 252 and which is configured to cooperate mechanically with the outer radial lug 259. When the lock 250 is in the lockout release orientation, the lug 259 is offset with respect to the lug 218 about the axis Y1, so as to not be able to come into axial abutment against the lug 218, and thus allow the translation of the lock 250 with respect to the housing 1 along the axis Y1. As shown in FIG. 16, when the lock 250 is in lockout position, that is to say simultaneously in the lockout orientation and at the lockout height, the lug 259 is axially aligned with the lug 218, such that the lug 259 comes into abutment against the lug 218 in the direction Y. Thus, in lockout position, the housing 1 retains the lock 250 at the lockout height. To modify the height of the lock 250 along the axis Y1, the lock 250 therefore has to be pivoted first to the lockout release orientation in order for the lugs 218 and 259 to be disengaged from one another. In this sense, the lugs 218 and 259 constitute axial stops, called "secondary axial stops". These secondary axial stops 218 and 259 are disposed so as to be facing one another parallel to the axis Y1, when the lock 250 is in the lockout position, so that, in lockout configuration, the housing 1 retains the lock 250 in retaining position by the axial abutment of the secondary stops 218 and 259 that are thus aligned. When the lock 250 is in lockout release orientation, whatever its height with respect to the housing 1, the secondary stops 218 and 259 are offset with respect to one another about the axis Y1. Thus, in operating configuration and in intermediate configuration, the stops 218 and 259 cannot come into axial abutment against one another, which means that the housing 1 allows the lock 250 to be displaced between the lockout height and the initial height.

For the embodiment of FIGS. 13 to 17, the recess 273 and the inner radial finger 253 constitute the primary axial stops for the slide 270 and the lock 250. As shown in FIGS. 16 and 17, these stops 253 and 273 are facing one another parallel to the axis Y1 when the lock 250 is in the lockout position, that is to say in lockout orientation and at lockout height. Thus, in lockout configuration, the lock 250, which is itself retained by the housing 1 via the secondary axial stops 218 and 259, retains the slide 270 in retaining position by the abutment of the primary axial stops that are thus facing one another. Then, the slide 270 keeps the switches 23 in isolation configuration. Indeed, it has been seen that, for the lockout position, the recess 273 axially captures the inner radial finger 253 to block the sliding of the lock 250 with respect to the slide 270.

To retain the switches 23 in isolation configuration when the slide 270 is held in retention position by the lock 250, provision is made for each slide 27 to come into axial abutment in the direction Y against the arm 71 of the slide 270 to which this slide 27 is attached, as shown for example in FIGS. 15A and 15B for the intermediate configuration. In operating configuration, each arm 71 of the slide 270 is kept in abutment in the direction Y against the slides 27 for the slide 270 to follow the sliding of the slides 27 and be displaced into authorization position when the switches 23 are in isolation configuration and into prevention position when the switches 23 are in conduction configuration.

In the situation of FIGS. 13 to 15B, that is to say when the lock 250 is in lockout release orientation, the primary axial stops 253 and 273 are offset with respect to one another about the axis Y1. In this situation, the lock 250 is no longer retained at the lockout height by the housing 1, since the secondary axial stops 218 and 259 are offset about the axis Y1. Then, if the lock 250 is not retained at the lockout height by other means, notably by a technician or a padlock, the lock 250 allows the slide 270 to be displaced between the prevention position and the authorization position. The primary and secondary stops thereby allow the slide 270 to be displaced between the prevention position and the authorization position in operating configuration and in intermediate configuration. Then, the lock 250 is returned and kept in abutment against the slide 270 in the direction Y, at the lockout height, and is displaced integrally with the slide 270 along the axis Y1. In the operating configuration, the isolation and conduction configuration of the switches 23 determines the position of the slide 270 along the axis Y1 with respect to the housing 1, respectively the authorization position and the prevention position.

In the operating configuration, the spring 278 keeps the lock 250 at the initial height with respect to the slide 270, whether the slide is in prevention or authorization position. The lock 250 is then necessarily in lockout release orientation.

The lock 250 comprises an outer part 251 which, in operating configuration with the slide 270 in prevention position, is retracted inside the housing 1, as shown in FIG. 13. In other words, the outer part 251 is in the direction Y with respect to the front face 11 of the housing 1 when the slide 270 is in prevention position, reflecting the fact that the switches 23 are in conduction configuration. Then, the lock 250 cannot be actuated by the technician, who cannot actuate the outer part 251 from the outside of the housing 1. By virtue of this arrangement, the technician cannot set the lockout system to lockout configuration when the switches 23 are in conduction configuration, thus preventing a lockout when a strong current from the electrical power supply passes through the switches 23.

In operating configuration with the slide 270 in authorization position, at least one end of the outer part 251 protrudes out of the housing 1, by passing through an opening formed in the front face 11, as shown in FIGS. 14A and 14B. For this, while the slide 270 is in authorization position, the lock 250 is still at the initial height. Then, the technician has the possibility of switching the lockout system over to lockout configuration, by first of all going through the intermediate configuration, by actuating the lock 250, via the outer part 251 protruding through the face 11 of the housing 1.

To switch from the operating configuration to the intermediate configuration, while the slide 270 is in the authorization position shown in FIGS. 14A and 14B, the technician pulls on the outer part 251 of the lock 250, to make the lock 250 slide with respect to the slide 270, from the initial height to the lockout height, and the slide 270 with respect to the housing from the authorization position to the retention position. Once the lockout height is reached, the lock 250 is in axial abutment against the slide 270 in a direction opposite the direction Y, by the abutment of the finger 253 of the lock 250, in a direction opposite the direction Y, against the end of the axial groove 274 of the lock emerging in the recess 273. The slide 270 is itself retained at the retention position, either by the switches 23 themselves, or, preferably, by an axial stop provided on the housing 1. When the slide 270 has reached the retention position and the lock 250 is still in the lockout release orientation, the lockout system has reached the intermediate configuration shown in FIGS. 15A and 15B.

To reach the intermediate configuration, the technician has pulled on the lock 250 against the elastic forces supplied by the springs 278 and 279. To then switch to the lockout configuration shown in FIG. 16, the technician pivots the lock 250 from the lockout release orientation to the lockout orientation, while keeping the lock 250 at the lockout height against the elastic forces supplied by the springs 278 and 279. Once the lockout orientation is reached, the lock 250 is kept in the lockout position by the axial abutment of the stops 259 and 218.

To return to operating configuration from the lockout release configuration, the technician first of all returns the lockout system to intermediate configuration by pivoting the lock from the lockout orientation to the lockout release orientation, thus obtaining the intermediate configuration shown in FIGS. 15A and 15B.

When the lockout system is in the intermediate configuration and the technician releases the lock 250, the slide 270 returns to the authorization position with respect to the housing 1 under the action of the slide spring 277, if the switches 23 are in isolation configuration, and the lock 250 reverts to the initial height under the action of the lock spring 278. The lockout system is then returned to operating configuration.

Provision is advantageously made for the lock 250 to mechanically actuate the device 40 without an intermediate part, as shown in FIGS. 13 to 16. For this, the lock 250 advantageously comprises a ramp 256, formed on the inner part 252.

As shown in FIGS. 15A, 15B and 16, when the lock 250 is at the lockout height and the slide 270 in authorization position, a part of the ramp 256 forming a cam is at the height of the control 44 along the axis Y1. On the other hand, in operating configuration, the part of the ramp 256 forming the cam is axially offset from the control 44.

When the lock 250 is in the lockout release orientation in the operating configuration, as shown in FIGS. 13, 14A and 14B, an axial part of the ramp 256 with a relatively small radius with respect to the axis Y1 is in contact with the control 44 without depressing it, or is not in contact with the control 44. Then, the ramp 256 does not actuate the control 44. When the lock 250 is in the lockout release orientation in the intermediate configuration, as shown in FIGS. 13 to 15B, the part of the ramp 256 forming the cam is at the height of the control 44. However, in the lockout release orientation, it is a part of the cam with a relatively small radius with respect to the axis Y1 which is in contact with the control 44, such that the control 44 is not depressed by the ramp 256. In other words, the ramp 256 does not actuate the mechanical control 44 when the lockout system is in intermediate configuration. When it is not actuated by the ramp 256, the control 44 freely assumes the position corresponding to the conduction configuration of the device 40, for example under the action of the internal spring of the device 40.

As shown in FIG. 16 while the lock 250 is in the lockout orientation, the part of the ramp 256 forming the cam is turned so as to press against the control 44, radially outwards, notably against the action of the internal spring of the device 40 if provided. Since the control 44 is thus actuated by the ramp 256 of the lock 250, the device 40 is in isolation configuration.

The lock 250 advantageously comprises a lockout orifice 255, which is formed through the outer part 251 of the lock 250, and which is designed to receive a padlock, aiming to lock the lockout system in lockout configuration.

In the embodiment of FIGS. 13 to 17, the face 11 of the housing 1 constitutes a masking system of the orifice 255. Indeed, in operating configuration, the face 11 masks the lockout orifice 255, in that the outer part 251 of the lock 250 is retracted inside the housing 1. Then, the technician does not have the possibility of installing the padlock on the lockout orifice 255. In lockout configuration, the lockout orifice 255 extends out of the housing 1 beyond the face 11, which therefore allows the orifice 255 to receive the padlock.

Once the padlock is in place in the lockout orifice 255, the padlock keeps the lock 250 at the lockout height, the lock 250 keeping the slide 270 in retention position. With the padlock in place, the switches 23 are kept in isolation configuration.

Any feature described above for one of the embodiments or one of the variants applies to the other embodiments and variants described above, as far as is technically possible.

The invention claimed is:

1. A protection unit, for electrically connecting an electrical power supply to control/command units of an electrical enclosure, the protection unit comprising a housing and at least one power switching device, which is disposed in the housing and which comprises:

- a power input, configured to be electrically connected to the electrical power supply;
- a power output, intended to be electrically connected to the control/command units; and
- a mechanical switch, which moves between a conduction configuration, in which the mechanical switch electrically links the power output to the power input, and an isolation configuration, in which the mechanical switch electrically isolates the power output from the power input;

wherein said at least one power switching device comprises an electrical actuator, which is configured to actuate the mechanical switch between the conduction configuration and the isolation configuration and wherein the protection unit further comprises:

- an electronic control unit, which is disposed in the housing and which is configured to control said at least one power switching device, by electrically controlling the electrical actuator;
- an auxiliary switching device, which is disposed in the housing and which comprises an auxiliary input, to be electrically connected to the electrical power supply, an auxiliary output, to be electrically connected to the electronic control unit, and a mechanical control, to switch the auxiliary switching device over between a conduction configuration, in which the auxiliary output is electrically linked to the auxiliary input, and an isolation configuration, in which the auxiliary output is electrically isolated from the auxiliary input; and
- a lockout system, which comprises a lock, which is movable with respect to the housing, the lockout system being configured to move between:

a lockout configuration, in which the lock is positioned in a lockout position and mechanically keeps the mechanical switch of said at least one power switching device in the isolation configuration and mechanically keeps the auxiliary switching device in the isolation configuration; and an operating configuration, in which the lock is positioned so as to allow the mechanical switch of said at least one power switching device to move between the isolation configuration and the conduction configuration and allows the auxiliary switching device to move between the conduction configuration and the isolation configuration.

2. The protection unit according to claim 1, wherein, in operating configuration, said at least one power switching device mechanically prevents the lock from being set to lockout position, when the mechanical switch is in conduction configuration, and mechanically allows the lock to be set to lockout position, when the mechanical switch is in isolation configuration.

3. The protection unit according to claim 1, wherein:

the lockout system comprises a slide, which is disposed in the housing and which slides with respect to the housing along a main axis that is fixed with respect to the housing;

in lockout configuration, to mechanically keep the mechanical switch of said at least one power switching device in isolation configuration, the lock keeps the slide in a retaining position with respect to the housing, in which the slide mechanically keeps the mechanical switch in isolation configuration; and in operating configuration, the slide is driven by the mechanical switch (23) of said at least one power switching device, between:

a prevention position, when the mechanical switch is in conduction configuration, in which the lock is prevented from being set to lockout position, and an authorization position, when the mechanical switch is in isolation configuration, in which the lock is allowed to be set to lockout position.

4. The protection unit according to claim 3, wherein:

the lock pivots with respect to the slide about the main axis, between a lockout orientation, when the lock is in lockout position, and a lockout release orientation, adopted in operating configuration;

the slide and the lock comprise axial stops, which are disposed so as to:

be opposite one another parallel to the main axis when the lock is in the lockout position, so that, in lockout configuration, the lock retains the slide in retaining position by an abutting of the axial stops thus opposite one another; and be offset with respect to one another about the main axis when the lock is in the lockout release orientation, so that, in operating configuration, the lock allows the slide to be displaced between the prevention position and the authorization position.

5. The protection unit according to claim 4, wherein the lock and the slide comprise rotation stops, which are disposed so as to:

be at a same height along the main axis, when the lockout system is in operating configuration with the slide in prevention position, for the slide to keep the lock in the lockout release orientation by abutment of the rotation stops; and be at different heights along the main axis, when the lockout system is in lockout configuration, for the slide to allow the lock to be pivoted between the lockout orientation and the lockout release orientation.

6. The protection unit according to claim 4, wherein the lock is fixed in translation along the main axis, with respect to the housing.

7. The protection unit according to claim 3, wherein the lockout system comprises a slide spring, which exerts an elastic force on the slide, by bearing on the housing, tending to displace the slide towards the prevention position, when the slide is in retaining position.

8. The protection unit according to claim 1, the lock comprises a ramp, which is configured to actuate the mechanical control of the auxiliary switching device, to set the auxiliary switching device to isolation configuration, when the lock is in lockout position and which is configured to not actuate the mechanical control when the lockout system is in operating configuration.

9. The protection unit according to claim 1, wherein the lock comprises a lockout orifice and the lockout system comprises a masking system, which is configured to:

allow the lockout orifice to receive a padlock, when the lockout system is in lockout configuration; and mask the lockout orifice when the lockout system is in operating configuration, to prevent the lockout orifice from receiving the padlock.

10. An electrical enclosure, comprising:

the protection unit according to claim 1; and the control/command units, electrically connected to the power output of said at least one power switching device.

* * * * *